United States Patent
Escuti et al.

(10) Patent No.: US 8,537,310 B2
(45) Date of Patent: Sep. 17, 2013

(54) POLARIZATION-INDEPENDENT LIQUID CRYSTAL DISPLAY DEVICES INCLUDING MULTIPLE POLARIZATION GRATING ARRANGEMENTS AND RELATED DEVICES

(75) Inventors: Michael James Escuti, Cary, NC (US); Chulwoo Oh, Hillsboro, OR (US); Ravi Komanduri, Raleigh, NC (US); Brandon L. Conover, Fuquay-Varina, NC (US); Jihwan Kim, Raleigh, NC (US)

(73) Assignee: North Carolina State University, Raleigh, NC (US)

( * ) Notice: Subject to any disclaimer, the term of this patent is extended or adjusted under 35 U.S.C. 154(b) by 198 days.

(21) Appl. No.: 13/122,244

(22) PCT Filed: Oct. 9, 2008

(86) PCT No.: PCT/US2008/011611
§ 371 (c)(1),
(2), (4) Date: Jun. 8, 2011

(87) PCT Pub. No.: WO2010/042089
PCT Pub. Date: Apr. 15, 2010

(65) Prior Publication Data
US 2011/0242461 A1 Oct. 6, 2011

(51) Int. Cl.
*G02F 1/1335* (2006.01)
*G02F 1/13* (2006.01)

(52) U.S. Cl.
USPC ............ 349/96; 349/98; 349/201; 349/202; 359/573

(58) Field of Classification Search
USPC ............ 349/96, 98, 201–202; 359/573
See application file for complete search history.

(56) References Cited

U.S. PATENT DOCUMENTS

| 2011/0188120 A1 | 8/2011 | Tabirian et al. |
| 2011/0262844 A1 | 10/2011 | Tabirian et al. |

FOREIGN PATENT DOCUMENTS

| EP | 1 420 275 A1 | 5/2004 |
| JP | 2004037480 | 2/2004 |
| JP | 2008070567 | 3/2008 |
| WO | WO 2006/092758 A2 | 9/2006 |
| WO | WO 2008/130561 A1 | 10/2008 |

OTHER PUBLICATIONS

International Preliminary Report on Patentability for International Application No. PCT/US2008/011611, mailed Jan. 21, 2011 (15 pages).

(Continued)

*Primary Examiner* — Nathanael R Briggs
(74) *Attorney, Agent, or Firm* — Myers Bigel Sibley & Sajovec

(57) ABSTRACT

A liquid crystal device includes a first polarization grating (101), a second polarization grating (102), and a liquid crystal layer (103). The first polarization grating (101) is configured to polarize and diffract incident light (190) into first and second beams (195,196) having different polarizations and different directions of propagation relative to that of the incident light (190). The liquid crystal layer (103) is configured to receive the first and second beams (195,196) from the first polarization grating (101). The liquid crystal layer (103) is configured to be switched between a first state that does not substantially affect respective polarizations of the first and second beams (195,196) traveling therethrough, and a second state that alters the respective polarizations of the first and second beams (195,196) traveling therethrough. The second polarization grating (102) is configured to analyze and diffract the first and second beams (195,196) from the liquid crystal layer (103) to alter the different directions of propagation thereof in response to the state of the liquid crystal layer (103). Related devices are also discussed.

16 Claims, 20 Drawing Sheets

(56) References Cited

OTHER PUBLICATIONS

International Search Report and Written Opinion for International Application No. PCT/US2008/011611, mailed Oct. 30, 2009 (21 pages).

Escuti and Jones. "39.4: Polarization-Independent Switching with High Contrast from a Liquid Crystal Polarization Grating" *SID 06 Digest* 39.4:1443-1446 (2006).

Oh and Escuti. "Achromatic Polarization Gratings as Highly Efficient Thin-Film Polarizing Beamsplitters for Broadband Light" *Proc of SPIE* 6682:668211-1 to 668211-12 (2007).

European Office Action Corresponding to European Application No. 08 876 353.7; Dated: Mar. 23, 2012; 7 Pages.

US 8,537,310 B2

POLARIZATION-INDEPENDENT LIQUID CRYSTAL DISPLAY DEVICES INCLUDING MULTIPLE POLARIZATION GRATING ARRANGEMENTS AND RELATED DEVICES

STATEMENT OF GOVERNMENT SUPPORT

This invention was made with Government support by the National Science Foundation (NSF) under contract 0621906. The U.S. Government has certain rights to this invention.

CLAIM OF PRIORITY

This application is a 35 U.S.C. §371 national phase application of PCT International Application No. PCT/US2008/011611, filed Oct. 9, 2008, the entire contents of which is incorporated by reference herein in its entirety. The above-referenced PCT International Application was published in the English language as International Publication No. WO 2010/042089 on Apr. 15, 2010.

FIELD OF THE INVENTION

The present invention relates to liquid crystal displays, and more particularly, to liquid crystal polarization gratings and related methods of fabrication.

BACKGROUND OF THE INVENTION

Liquid crystals may include liquids in which an ordered arrangement of molecules exists. Typically, liquid crystal (LC) molecules may be anisotropic, having either an elongated (rod-like) or flat (disk-like) shape. As a consequence of the ordering of the anisotropic molecules, a bulk LC often exhibits anisotropy in its physical properties, such as anisotropy in its mechanical, electrical, magnetic, and/or optical properties.

As a result of the rod-like or disk-like nature, the distribution of the orientation of LC molecules may play an important role in optical applications, such as in liquid crystal displays (LCDs). In these applications, LC alignment may be dictated by an alignment surface. The alignment surface may be treated so that the LC aligns relative to the surface in a predictable and controllable way. In many cases, the alignment surface may ensure a single domain through the LC device. In the absence of a treated alignment surface, the LC may have many domains and/or many discontinuities in orientation. In optical applications, these domains and discontinuities may cause scattering of light, leading to degradation in the performance of the display.

Many liquid crystal devices (including liquid crystal displays) may require input light that is polarized in order to correctly function. However, since most light sources produce unpolarized light (e.g., fluorescent lamps, light emitting diodes, Ultra High Performance lamps, incandescent lamps), liquid crystal devices may use one or more linear polarizers to convert the unpolarized light from a light source into light of a desired polarization state. Conventional linear polarizers may permit light of the desired polarization state to pass therethrough; however such linear polarizers may also absorb light of other polarization states. As such, at least 50% of the available light from the light source may be lost, for example, as heat. Liquid crystal devices may therefore have significant optical power losses (for example, greater than 50%), and as such, may require light sources more powerful than necessary. This may be undesirable, for example, for reasons relating to power consumption, heat, and/or costs.

SUMMARY OF THE INVENTION

According to some embodiments of the present invention, a liquid crystal device includes a first polarization grating, a liquid crystal layer, and a second polarization grating. The first polarization grating is configured to polarize and diffract incident light into first and second beams having different polarizations and having different directions of propagation than that of the incident light. The liquid crystal layer is configured to receive the first and second beams from the first polarization grating, and is configured to be switched between a first state that does not substantially affect respective polarizations of the first and second beams traveling therethrough and a second state that alters the respective polarizations of the first and second beams traveling therethrough. The second polarization grating is configured to receive the first and second beams from the liquid crystal layer, and is configured to analyze and diffract the first and second beams to alter the directions of propagation thereof in response to the state of the liquid crystal layer.

In some embodiments, the second polarization grating may be configured to alter the directions of propagation of the first and second beams to transmit light that propagates in a direction substantially parallel to that of the incident light when the liquid crystal layer is in the second state, and to transmit light that does not propagate in the direction substantially parallel to that of the incident light when the liquid crystal layer is in the first state. In such embodiments, the first polarization grating may have a first periodic birefringence pattern, and the second polarization grating may have a second periodic birefringence pattern that is inverted relative to the first periodic birefringence pattern. For example, the first polarization grating may be a polymerized liquid crystal layer including a first periodic nematic director pattern, and the second polarization grating may be a polymerized liquid crystal layer including a second periodic nematic director pattern having a same periodicity but globally rotated about 180 degrees relative to the first nematic director pattern.

In other embodiments, the second polarization grating may be configured to alter the directions of propagation of the first and second beams to transmit light that propagates in a direction substantially parallel to that of the incident light when the liquid crystal layer is in the first state, and to transmit light that does not propagate in the direction substantially parallel to that of the incident light when the liquid crystal layer is in the second state. In such embodiments, the first and second polarization gratings may have respective first and second periodic birefringence patterns having a same periodicity and a same orientation. For example, the first and second polarization gratings may be polymerized liquid crystal layers including similarly-oriented local nematic director patterns.

In some embodiments, the liquid crystal device may include an angle filtering stage configured to receive the output light transmitted from the second polarization grating. The angle filtering stage may be configured to block the output light that propagates at angles greater than a desired angle and direct the output light that propagates at angles less than the desired angle towards a screen. For example, the angle filtering stage may be configured to permit the output light that propagates in the direction substantially parallel to the incident light but block the output light that does not propagate in the direction substantially parallel to the incident light. In some embodiments, the angle filtering stage may include at least one lens and an aperture stop. In other embodiments, the angle filtering stage may be a privacy film.

In other embodiments, the incident light may be unpolarized light, and the first polarization grating may be configured to diffract the incident light such that the first and second beams respectively comprise greater than about 25% of an intensity of the incident light over a visible wavelength range. In addition, the second polarization grating may be configured to diffract the first and second beams to transmit light comprising greater than about 50% of the intensity of the incident light over the visible wavelength range. In some embodiments, the second polarization grating may be configured to transmit the output light with a transmittance of greater than about 90% over a wavelength range of about 400 nm to about 700 nm.

In some embodiments, the liquid crystal device may include a third polarization grating, an intermediate layer, and a fourth polarization grating that define an offset compensator.

The third polarization grating may be configured to receive and diffract the first and second beams from the second polarization to alter the respective directions of propagation thereof. The intermediate layer may be configured to transmit the first and second beams from the third polarization grating therethrough without substantially altering the respective directions of propagation thereof. The fourth polarization grating may be configured to receive and diffract the first and second beams from the intermediate layer, to alter the respective directions of propagation thereof to provide offset-compensated output light that propagates in a direction substantially parallel to that of the first and second beams output from the second polarization grating. The intermediate layer may have a thickness configured to separate the third and fourth polarization gratings by a distance substantially similar to a distance between the second polarization and the liquid crystal layer such that the offset-compensated output light has a reduced spatial offset relative to that of the first and second beams output from the second polarization grating.

According to other embodiments of the present invention, a liquid crystal device includes a polarization grating, a liquid crystal layer, and a reflective substrate. The polarization grating is configured to polarize and diffract input light into first and second beams having different polarizations and having different directions of propagation than that of the input light. The liquid crystal layer is configured to receive the first and second beams from the first polarization grating. The liquid crystal layer is configured to be switched between a first state that does not substantially alter respective polarizations of the first and second beams traveling therethrough and a second state that alters the respective polarizations of the first and second beams traveling therethrough. The reflective substrate is configured to receive the first and second beams from the liquid crystal layer and reflect the first and second beams back through the liquid crystal layer and the polarization grating. The polarization grating is configured to analyze and diffract the reflected first and second beams from the reflective substrate to alter the respective directions of propagations thereof in response to the state of the liquid crystal layer to provide output light therefrom.

In some embodiments, the polarization grating may be a second polarization grating, and the device may include a first polarization grating configured to polarize and diffract incident light into first and second beams having different polarizations and having different directions of propagation than that of the incident light. The device may also include a lens configured to receive the first and second beams from the first polarization grating and provide the first and second beams to the second polarization grating as the input light thereto.

In other embodiments, the device may include a reflective aperture stop configured to receive the first and second beams from the lens and reflect the first and second beams onto the second polarization grating to provide the input light thereto. The reflective aperture stop may be configured to transmit the output light from the second polarization grating therethrough towards a screen.

According to further embodiments of the present invention, a device includes a first polarization grating configured to receive incident light and transmit light therefrom, and a second polarization grating configured to receive the light from the first polarization grating and transmit output light therefrom comprising first and second component beams having different polarizations. At least one of the first and second polarization gratings is a switchable polarization grating configured to be switched between a first state that does not substantially alter respective polarizations and directions of propagation of the light traveling therethrough, and a second state that alters the respective polarizations and directions of the light traveling therethrough.

In some embodiments, the first polarization grating may be the switchable polarization grating. In the first state, the first polarization grating may be configured to transmit the incident light therethrough without substantially altering the respective polarizations and directions of propagation thereof. In the second state, the first polarization grating may be configured to polarize and diffract the incident light into first and second beams having different polarizations and different directions of propagation than that of the incident light. The second polarization grating may be a fixed grating configured to analyze and diffract the first and second beams from the first polarization grating to alter the respective directions of propagation thereof when the first polarization grating is in the second state, and may be configured to polarize and diffract the incident light into the first and second beams having the different polarizations and different directions of propagation when the first polarization grating is in the first state.

In other embodiments, the first polarization grating may be a fixed grating configured to polarize and diffract the incident light into first and second beams having different polarizations and different directions of propagation than that of the incident light, and the second polarization grating may be the switchable polarization grating. In the first state, the second polarization grating may be configured to transmit the first and second beams from the first polarization grating therethrough without substantially altering the respective polarizations and directions of propagation thereof. In the second state, the second polarization grating may be configured to analyze and diffract the first and second beams from the first polarization grating to alter the respective polarizations and directions of propagation thereof.

In some embodiments, the first and second polarization gratings may have respective birefringence patterns having orientations that are inverted relative to one another. In other embodiments, the first and second polarization gratings may have respective birefringence patterns having substantially similar orientations.

Other elements and/or devices according to some embodiments will become apparent to one with skill in the art upon review of the following drawings and detailed description. It is intended that all such additional devices be included within this description, be within the scope of the invention, and be protected by the accompanying claims.

DETAILED DESCRIPTION OF EMBODIMENTS OF THE INVENTION

Figure 1A:
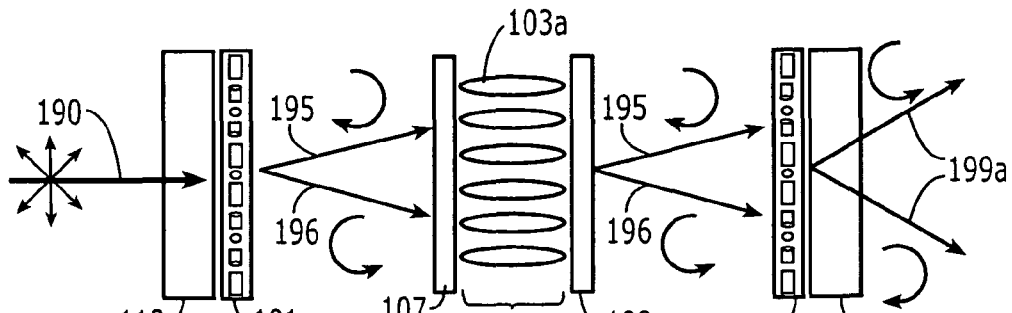
FIGS. 1A and 1B are block diagrams illustrating multi-polarization grating arrangements according to some embodiments of the present invention.

The present invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity. Like numbers refer to like elements throughout.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof As used herein, the term "and/or" includes any and all combinations of one or more of the associated listed items.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present. Likewise, when light is received or provided "from" one element, it can be received or provided directly from that element or from an intervening element. On the other hand, when light is received or provided "directly from" one element, there are no intervening elements present.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. Accordingly, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

It will be understood by those having skill in the art that, as used herein, a "transmissive" or "transparent" substrate may allow at least some of the incident light to pass therethrough. Accordingly, the transparent substrate may be a glass substrate in some embodiments. In contrast, a "reflective" substrate as described herein may reflect at least some of the incident light. Also, "polymerizable liquid crystals" may refer to relatively low-molecular weight liquid crystal materials that can be polymerized, and may also be described herein as "reactive mesogens". In contrast, "non-reactive liquid crystals" may refer to relatively low-molecular weight liquid crystal materials that may not be polymerized.

Embodiments of the present invention are described herein with reference to liquid crystal (LC) materials and polarization gratings composed thereof. As used herein, the liquid crystals can have a nematic phase, a chiral nematic phase, a smectic phase, a ferroelectric phase, and/or another phase. In addition, a number of photopolymerizable polymers may be used as alignment layers to create the polarization gratings described herein. In addition to being photopolymerizable, these materials may be inert with respect to the LC, should provide stable alignment over a range of operating temperatures of the LC device (e.g., from about −50° C. to about 100° C.), and should be compatible with manufacturing methods described herein. Some examples of photopolymerizable polymers include polyimides (e.g., AL 1254 commercially available from JSR Micro, Inc (Sunnyvale, Calif.)), Nissan RN-1199 available from Brewer Science, Inc. (Rolla, Mo.), and cinnamates (e.g., polyvinyl 4-methoxy-cinnamate as described by M. Schadt et al., in "Surface-Induced Parallel Alignment of Liquid Crystals by Linearly Polymerized Photopolymers," Jpn. J. Appl. Phys., Vol. 31 (1992), pp. 2155-2164). Another example of a photopolymerizable polymer is Staralign™, commercially available from Vantico Inc. (Los Angeles, Calif.). Further examples include chalcone-epoxy materials, such as those disclosed by Dong Hoon Choi and co-workers in "Photo-alignment of Low-molecular Mass Nematic Liquid Crystals on Photochemically Bifunctional Chalcone-epoxy Film by Irradiation of a Linearly Polarized UV," Bull. Korean Chem. Soc., Vol. 23, No. 4 587 (2002), and coumarin side chain polyimides, such as those disclosed by M. Ree and co-workers in "Alignment behavior of liquid-crystals on thin films of photosensitive polymers—Effects of photoreactive group and UV-exposure," Synth. Met., Vol. 117(1-3), pp. 273-5 (2001) (with these materials, the LC aligns nearly perpendicularly to the direction of polarization).

Additional examples of methods of liquid crystal alignment are also discussed in and U.S. Pat. No. 7,196,758 to Crawford et al. Furthermore, some structures described herein may involve precise fabrication through a balance of spin-coating processes and liquid crystal materials. Additional structures and/or methods for use with some embodiments of the present invention are discussed in PCT Publication No. WO 2006/092758 to Escuti, et al., the disclosure of which is incorporated by reference herein in its entirety.

Polarization gratings according to some embodiments of the present invention may be transparent, thin-film, beam-splitters that periodically alter the local polarization state and propagation direction of light traveling therethrough. In contrast, conventional linear polarizers may operate by converting incident light into a single polarization state, permitting light of that polarization state to travel therethrough, but absorbing light of other polarization states.

Polarization gratings according to some embodiments of the present invention may have a spatially-variant uniaxial birefringence (i.e., $n(x)=[\cos(\pi x/\Lambda), \sin(\pi x/\Lambda), 0]$), and may provide non-zero-order diffraction efficiencies of up to 100%. As used herein, "zero-order" light propagates in a direction substantially parallel to that of the incident light, i.e., at a substantially similar angle of incidence, and is also referred to herein as "on-axis" light. For example, in several of the embodiments described in detail below, the incident light is normal to the first polarization grating; thus, "zero-order" or "on-axis" light would also propagate substantially normal to the first polarization grating in these embodiments. In contrast, "non-zero-order light", such as "first-order" light and/or "second-order light", propagates in directions that are not parallel to the incident light. In particular, the second-order light propagates at greater angles than the first-order light relative to the angle of incidence. As such, first- and second-order light are collectively referred to herein as "off-axis" light.

Some embodiments of the present invention arise from realization that a sequential arrangement of two parallel polarization gratings may be used to diffract incident light into two zero-order beams without significant losses, while a sequential arrangement of two antiparallel polarization gratings may be used to diffract incident light into two non-zero-order beams without significant losses. As used herein, a "parallel" polarization grating arrangement includes first and second polarization gratings with the same birefringence $n(x)$, i.e., the respective birefringence patterns of the first and second polarization gratings have substantially similar orientations. In contrast, an "antiparallel" polarization grating arrangement includes first and second polarization gratings having opposite birefringence, i.e., $n(x)$ and $n(-x)$. In other words, the second polarization grating has a birefringence pattern that is inverted or rotated by about 180 degrees relative to that of the first polarization grating.

Accordingly, some embodiments of the present invention provide polarization grating arrangements including two or more polarization gratings positioned relative to a liquid crystal (LC) layer. This arrangement may be used to provide liquid crystal display (LCD) devices that work directly with unpolarized light and/or light of any polarization, without substantial polarization-related losses. More particularly, the first and second polarization gratings may be positioned at the input and the output of the liquid crystal layer, respectively. In such an arrangement, the second polarization grating is generally referred to herein as an "analyzer", and thus, "analyzes" (i.e., polarizes) the polarized light received from the first polarization grating and/or liquid crystal layer. The liquid crystal layer is configured to be switched between a first state that does not substantially affect the polarization of light traveling therethrough, and a second state that "reverses" the polarization of the light traveling therethrough (i.e., converts the light to its opposite or orthogonal polarization). For example, the liquid crystal layer may be a switchable birefringent liquid crystal layer that can be electrically switched between zero and half-wave retardation responsive to a voltage applied thereto, with relatively high accuracy and relatively wide bandwidth. The liquid crystal layer may be monolithic, or may define a pixel array including a plurality of pixels.

Because polarization gratings according to some embodiments of the present invention may be used to diffract incident light into two beams without significant losses, the first polarization grating may be used to diffract the incident light into two non-zero-order beams (with up to 50% efficiency into each beam) for input to the LC layer, and the second polarization grating may be used to diffract the two beams output from the LC layer back to the original angle of incidence to provide zero-order output light to a viewing screen in response to the state of the LC layer. When combined with angle filtering and imaging means as described herein, some embodiments of the present invention may provide LCD devices with improved brightness (for example, twice the brightness of conventional LCD devices) and high contrast (up to 5000:1) as compared to conventional LCD devices. Embodiments of the present invention may be used in both projection-type LCD devices (front or rear, reflective or transmissive), and/or in direct-view type LCD devices.

As used herein, the "transmittance" of a grating arrangement may refer the intensity of the output light divided by the intensity of the input light, and thus, includes the effects of the grating layer plus all other layers or substrates. In contrast, as used herein, "diffraction efficiency" may refer to the output intensity of a particular diffraction order divided by the total light intensity transmitted, which may be used as a normalization to remove the effects of the substrates and/or other layers.

Figure 1B:
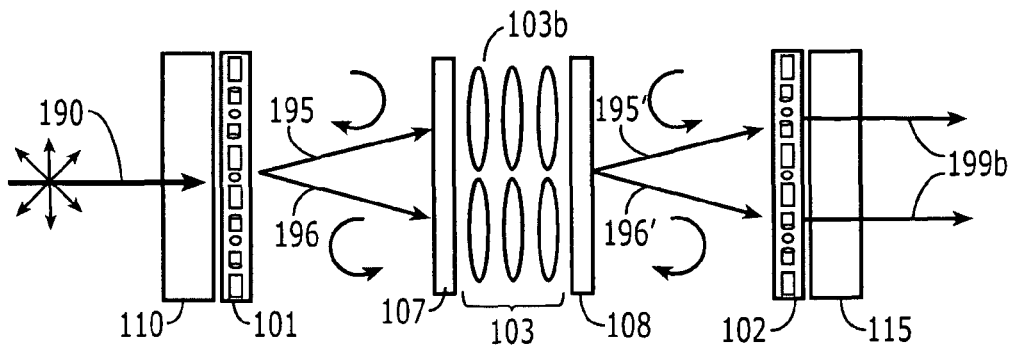

FIGS. 1A and 1B illustrate multi-polarization grating arrangements according to some embodiments of the present invention. In particular, FIG. 1A illustrates a dual polarization grating arrangement in a first state where no voltage is applied to its liquid crystal layer, while FIG. 1B illustrates the dual polarization grating arrangement in a second state where a voltage is applied to its liquid crystal layer. Referring now to FIGS. 1A and 1B, the dual polarization grating arrangement includes a first polarization grating 101, a liquid crystal layer 103, and a second polarization grating 102 provided between transmissive substrates, shown as glass substrates 110 and 115. The substrates 110 and/or 115 may also include one or more electrodes (not shown) on surfaces thereof, for instance, as provided by a transparent indium tin oxide (ITO) coating. The polarization gratings 101 and 102 include respective alignment layers 107 and 108 thereon, and the liquid crystal layer 103 is aligned in the cell gap between the polarization gratings 101 and 102 according to the periodic alignment condition provided by the alignment layers 107 and 108. The liquid crystal layer 103 includes liquid crystal molecules that are configured to be switched between first and second orientations responsive to a voltage applied thereto.

The polarization gratings 101 and 102 are configured to polarize and diffract incident light into at least two beams having different polarization states and/or different directions of propagation without substantial absorption of any one polarization state. Polarization gratings that may be used in some embodiments of the present invention are described, for example, in PCT Application No. PCT/US2008/004897 to Escuti, et al. entitled "Multi-Layer Achromatic Liquid Crystal Polarization Gratings and Related Fabrication Methods", filed Apr. 16, 2008, and/or PCT Application No. PCT/US2008/004888 to Escuti, et al. entitled "Low-Twist Chiral Liquid Crystal Polarization Gratings and Related Fabrication Methods", filed Apr. 16, 2008, the disclosures of which are hereby incorporated by reference herein as if set forth in their entireties.

The polarization gratings 101 and/or 102 may provide diffraction properties such as at least three diffracted orders (0, ±1), orthogonal circular polarizations of the non-zero-orders, and/or highly polarization-sensitive non-zero-orders (which may be linearly proportional to the Stokes parameter). For example, the polarization gratings 101 and/or 102 may be polymerized liquid crystal films including anisotropic periodic molecular structures with birefringence patterns configured to diffract the incident light with a diffraction efficiency of greater than about 50%, and in some embodiments, greater than about 90%. In particular, with incident circular polarization, the polarization gratings 101 and/or 102 may provide up to about 100% efficiency into the non-zero orders. With linear incident polarization or unpolarized input light, the polarization gratings 101 and/or 102 may provide up to about 50% efficiency into each of the first orders. In some embodiments, the polarization gratings 101 and/or 102 may include multiple polarization grating layers having respective periodic local anisotropy patterns that are offset relative to one another to define a phase shift therebetween and/or rotated (or "twisted") by a twist angle over respective thicknesses thereof. Also, one or more of the polarization grating layers may be a nematic liquid crystal layer, so as to provide a switchable liquid crystal polarization grating.

In some embodiments, the polarization gratings 101 and 102 may be identical in type, thickness, periodicity, and/or molecular orientation. For example, the polarization gratings 101 and 102 may include periodic molecular structures such that their local birefringence patterns have the same orientation, i.e., a "parallel" arrangement. In other embodiments, the periodic molecular structures of the polarization gratings 101 and 102 may have their respective local birefringence patterns oriented oppositely (i.e., rotated by about 180 degrees) in an "antiparallel" arrangement.

Figure 1C:
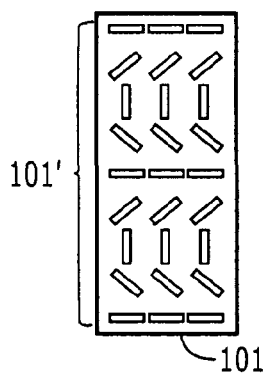
FIGS. 1C and 1D are alternate views illustrating the local nematic director orientations of the polarization gratings of FIGS. 1A and 1B.
Figure 1D:
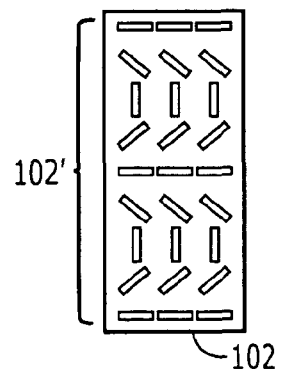

As shown in FIGS. 1A and 1B, the polarization gratings 101 and 102 are polymerized liquid crystal layers having an antiparallel arrangement. FIGS. 1C and 1D provide alternate views illustrating the nematic director orientation of the polarization gratings 101 and 102 in greater detail. In particular, FIG. 1C illustrates the nematic director orientation 101' of the polarization grating 101, while FIG. 1D illustrates the opposite nematic director orientation 102' of the polarization grating 102. However, in other embodiments, the molecular structures of the polarization gratings 101 and 102 may be parallel and may have the same periodicity, but may be offset such that their local anisotropy patterns are shifted relative to one another by an angular shift or phase shift of between about 0° (degrees) to about 180° (degrees).

In FIGS. 1A and 1B, the liquid crystal layer 103 is a vertically aligned nematic (VAN) type layer in which the LC molecules have a homeotropic alignment. As such, when no voltage is applied to the liquid crystal layer 103, the LC molecules are oriented normal to the adjacent surfaces of the polarization gratings 101 and 102, as shown in FIG. 1A. When oriented in such a manner, also referred to herein as the "OFF" state, the liquid crystal layer 103 is configured to allow light to pass therethrough without substantially affecting its polarization state (i.e., with substantially zero retardation). In contrast, as shown in FIG. 1B, the LC molecules are oriented substantially parallel to the surfaces of the polarization gratings 101 and 102 when a switching voltage is applied to the liquid crystal layer 103. When oriented as shown in FIG. 1B, also referred to herein as the "ON" state, the liquid crystal layer 103 is configured to alter the polarization state of light passing therethrough. In some embodiments, the liquid crystal layer 103 may have a thickness configured to provide half-wave retardation of light that passes therethrough. However, liquid crystal layers with other thicknesses and/or phase shifts may also be used.

Example operation of dual polarization grating arrangements in accordance with some embodiments of the present invention will now be described with reference to the OFF state of FIG. 1A and the ON state of FIG. 1B. Referring now to FIG. 1A, the first polarization grating 101 is configured to polarize input or incident light 190 into first and second component beams 195 and 196 having different polarizations. The incident light 190 may be unpolarized in some embodiments, but may be polarized in other embodiments. In some embodiments, the polarization of the first beam 195 may be orthogonal to the polarization of the second beam 196. For example, the first beam 195 may be left-handed circularly polarized, while the second beam 196 may be right-handed circularly polarized. The first polarization grating 101 is also configured to diffract the incident light 190 such that the first and second beams 195 and 196 have different directions of propagation than that of the incident light 190. In other words, the beams 195 and 196 propagate at different diffractive angles relative to the angle of incidence of the incident light 190. For example, the incident light 190 may be diffracted with up to about 50% efficiency into each of the first-order beams 195 and 196 at diffractive angles having a range of about ±5° to about ±30°, and in some embodiments, about ±20° degrees.

As shown in FIG. 1A, in the OFF state, no voltage is applied to the liquid crystal layer 103. As such, the orientation 103a of the molecules of the liquid crystal layer 103 is configured such that the first and second beams 195 and 196 are transmitted therethrough without substantially affecting the respective polarizations of the first and second beams 195 and 196. The second polarization grating 102 is likewise configured to analyze and diffract the first and second beams 195 and 196 received from the liquid crystal layer 103. As the second polarization grating 102 is antiparallel to the first polarization grating 101, the second polarization grating 102 changes the polarizations of the left- and right-beams 195 and 196 to right- and left-handed beams, respectively, and alters the respective directions of propagation of the beams 195 and 196 to transmit output light 199a that is further diffracted away from the direction of propagation of the incident light 190 (i.e., away from the angle of incidence) when the LC layer 103 is in the OFF state. More generally, the second polarization grating 102 is configured to diffract the beams 195 and 196 into different directions or angles based on their respective polarizations after being output from the liquid crystal layer 103. This "first-order" output light 199a may have a substantially similar intensity as that of the input light 190, but may be blocked and/or otherwise prevented from being transmitted to a viewing screen to provide improved contrast, as discussed in detail below.

Referring now to FIG. 1B, the first polarization grating 101 is similarly configured to polarize and diffract the incident light 190 into first and second component beams 195 and 196 having different polarizations and different directions of propagation relative to the incident light 190. For example, as noted above, the first beam 195 may be left-handed circularly polarized, while the second beam 196 may be right-handed circularly polarized. However, as a switching voltage is applied to the liquid crystal layer 103, the orientation 103b of the molecules of the liquid crystal layer 103 is configured to alter the respective polarizations of the first and second beams 195 and 196 as they pass therethrough. In the above example, the liquid crystal layer 103 in the ON state may retard the polarizations of the left- and right-handed circularly polarized beams 195 and 196 by a half wavelength (i.e., by 180°) to provide right- and left-handed circularly polarized beams 195' and 196'. The second polarization grating 102 is configured to analyze and diffract the beams 195' and 196' received from the liquid crystal layer 103. However, as the beams 195' and 196' have the opposite circular polarization than those output from the liquid crystal layer 103 in FIG. 1A, the second polarization grating, which is antiparallel to the first polarization grating 101, 102 is configured to alter the respective directions of propagation of the beams 195' and 196' to transmit output light 199b that is diffracted towards the direction of propagation of the incident light 190. In particular, as shown in FIG. 1B, the second polarization grating 102 re-directs the beams 195' and 196' in parallel, such that the output light 199b propagates in a direction substantially parallel to that of the incident light 190 (i.e., toward from the angle of incidence) when the liquid crystal layer 103 is in the ON state. The polarization grating 102 may diffract the incident circularly polarized beams 195' and 196' with up to 100% efficiency. Thus, the "zero-order" output light 199b may have an intensity substantially similar to that of the incident light 190 in some embodiments, and may thereby be transmitted to a viewing screen without significant polarization-related losses to provide improved brightness, as discussed in detail below.

Although described above with reference to a vertically aligned nematic (VAN) liquid crystal layer 103, it is to be understood that other types of liquid crystal materials may be used to provide the liquid crystal layer 103. For example, in some embodiments, a uniform planar liquid crystal layer, in which LC molecules are homogeneously aligned parallel to the surfaces of the polarization gratings 101 and 102 when no voltage is applied, may be used as the liquid crystal layer 103. Other liquid crystal materials may also be used. Such materials are well-known in the art and need not be discussed further herein. Also, although illustrated in FIGS. 1A-1B with reference to an arrangement where the polarization gratings 101 and 102 and the liquid crystal layer 103 are provided between the transmissive substrates 110 and 115, it is to be understood that the transmissive substrates 110 and 115 and the liquid crystal layer 103 may be provided between the polarization gratings 101 and 102 in some embodiments, for example, as illustrated below in FIGS. 2A-4C.

Figure 2A:
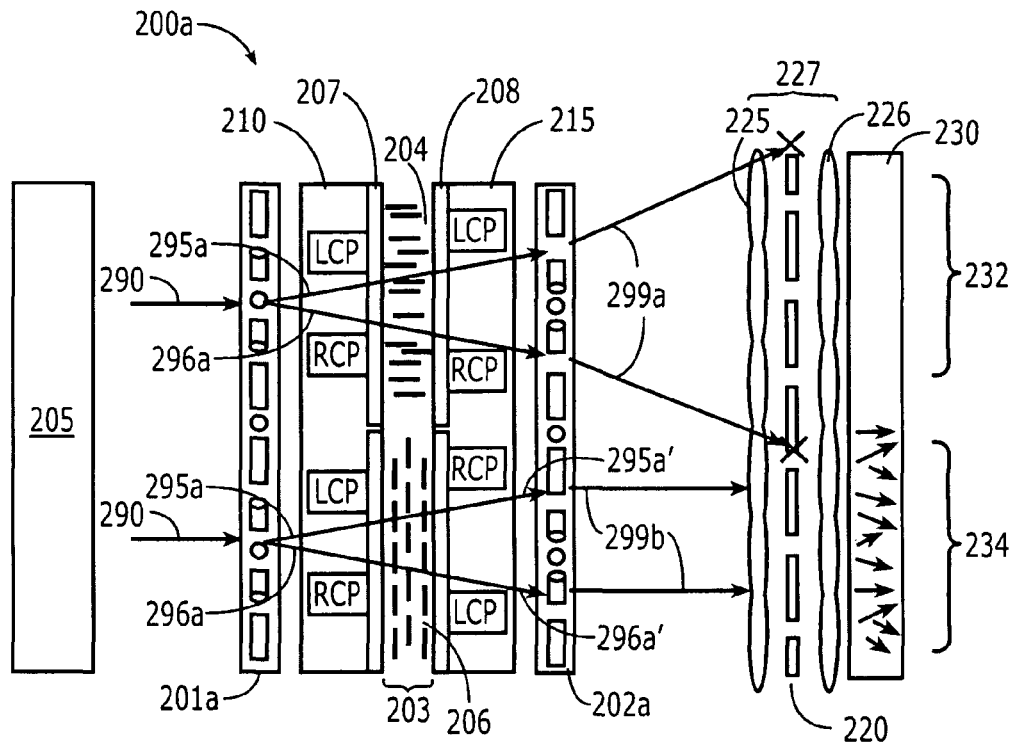
FIGS. 2A and 2B are block diagrams illustrating direct-view liquid crystal display devices including multi-polarization grating arrangements according to some embodiments of the present invention.
Figure 2B:
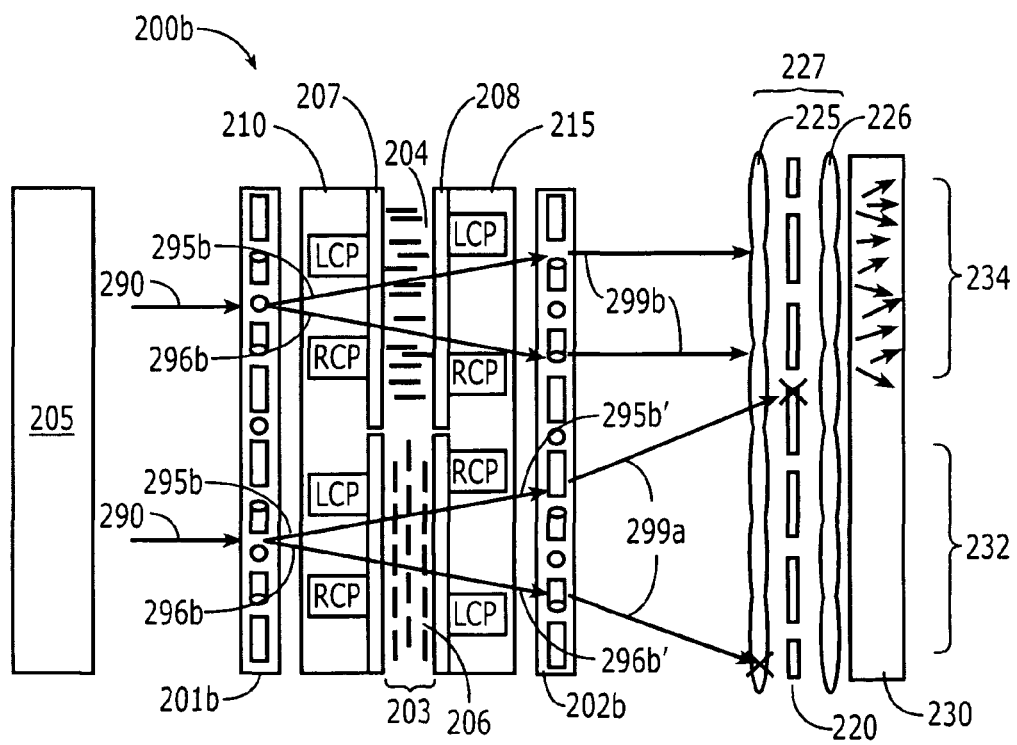

FIGS. 2A and 2B illustrate multi-polarization grating arrangements according to some embodiments of the present invention as implemented in a direct view liquid crystal display (LCD) device. In particular, FIG. 2A illustrates a LCD device 200a that includes polarization gratings 201a and 202a implemented in an antiparallel arrangement (i.e., where the nematic director patterns thereof are of opposite handedness), while FIG. 2B illustrates a LCD device 200b that includes polarization gratings 201b and 202b implemented in a parallel arrangement (i.e., where the nematic director patterns thereof are of the same handedness). The LCD devices 200a and 200b respectively include a light source 205, transmissive substrates 210 and 215 including alignment layers 207 and 208 thereon, and a liquid crystal layer 203 between the transmissive substrates 210 and 215 and aligned according to the periodic alignment conditions provided by the alignment layers 207 and 208. FIGS. 2A and 2B illustrate the liquid crystal layer 203 as including two pixels by way of example; however, the liquid crystal layer 203 may include fewer or more pixels in some embodiments of the present invention. The LCD devices 200a and 200b further include an angle-filtering stage 227 including micro-lenses 225 and 226 and a pinhole aperture 220, and a viewing screen 230. The light source 205 may include a fluorescent lamp, a light emitting diode (LED)-based lamp, a backlight, and/or other light source configured to emit unpolarized light 290. However, it is to be understood that, in some embodiments, the light source 205 may be configured to emit polarized light. The angle-filtering stage 227 is configured to permit output light propagating in a direction substantially parallel to the incident light 290 to be imaged on the viewing screen 230, but block output light that is not propagating direction parallel to the incident light 290.

Example operations of the LCD devices 200a and 200b will now be described. Referring now to the antiparallel polarization grating arrangement of FIG. 2A, the unpolarized incident light 290 from the light source 205 enters the first polarization grating 201a, and is polarized and diffracted into two orthogonal, circularly polarized beams 295a (left-handed circularly polarized) and 296a (right-handed circularly polarized) having different, non-zero-order propagation directions. Depending on the diffraction efficiency of the polarization grating 201a, the beams 295a and 296a may include all wavelengths of visible light (e.g., from about 400 nm to about 700 nm), nearly 50% in each order. Both beams 295a and 296a pass through the LC layer 203, illustrated as including a first pixel 204 in the OFF state, and a second pixel 206 in the ON state. The beams 295a and 296a passing through the OFF pixel 204 do not experience a change in their respective polarizations, and are then analyzed and diffracted by the second polarization grating 202a into output light 299a at greater angles relative to the angle of incidence of the unpolarized input light 290. This off-axis output light 299a is then blocked by the angle-filtering stage 227 to prevent the light 299a from reaching the viewing screen 230. As such, a "dark" pixel 232 (representing as little as 0% of the input light 290) is presented to a viewer.

In contrast, the beams 295a and 296a passing through the ON pixel 206 experience half-wave retardation, and are both converted into the opposite circular polarizations 295a' (right-handed circularly polarized) and 296a' (left-handed circularly polarized), respectively. The beams 295a' and 296a' are then analyzed and diffracted by the second polarization grating 202a into output light 299b at an angle substantially similar to the original angle of incidence of the input light 290. This on-axis light 299b is provided to the viewing screen 230 via the angle-filtering stage 227. As such, a "bright" pixel 234 (representing up to 100% of the intensity/brightness of the input light 290) is presented to the viewer.

Referring now to the parallel polarization grating arrangement of FIG. 2B, the unpolarized input light 290 from the light source 205 is similarly polarized and diffracted into two orthogonal, circularly polarized beams 295b (left-handed circularly polarized) and 296b (right-handed circularly polarized) by the first polarization grating 201b. The beams 295b and 296b passing through the OFF pixel 204 of the liquid crystal layer 203 do not experience a change in their respective polarizations, while the beams 295b and 296b passing through the ON pixel 206 experience half-wave retardation to provide beams of the opposite circular polarizations 295b' (right-handed circularly polarized) and 296b' (left-handed circularly polarized), respectively. As such, due to their altered polarizations, the beams 295b' and 296b' are analyzed and diffracted by the second polarization grating 202b to transmit off-axis output light 299a, which is blocked by the angle-filtering stage 227. In contrast, the beams 295b and 296b are analyzed and diffracted by the second polarization grating 202b to transmit on-axis output light 299b, which is provided to the viewing screen 230 via the angle-filtering stage 227. Thus, in the embodiment of FIG. 2B, the OFF pixel 204 provides the bright pixel 234, while the ON pixel 206 provides the dark pixel 232.

Accordingly, some embodiments of the present invention as described above with reference to FIGS. 2A and 2B may provide direct view LCD devices that may have twice the brightness of conventional LCD devices. In some embodiments, the polarization gratings 201 and 202 may be achromatic polarization gratings used to achieve relatively high contrast for a broad wavelength range including red, green, and blue light. In addition, a diffuser (not shown) may be included in some embodiments of the present invention to expand the viewing angle. Also, a privacy film (such as those manufactured by 3M™ Company) that blocks off-axis light but passes on-axis light may be used as the angle filtering stage 227 in some embodiments.

Figure 3A:
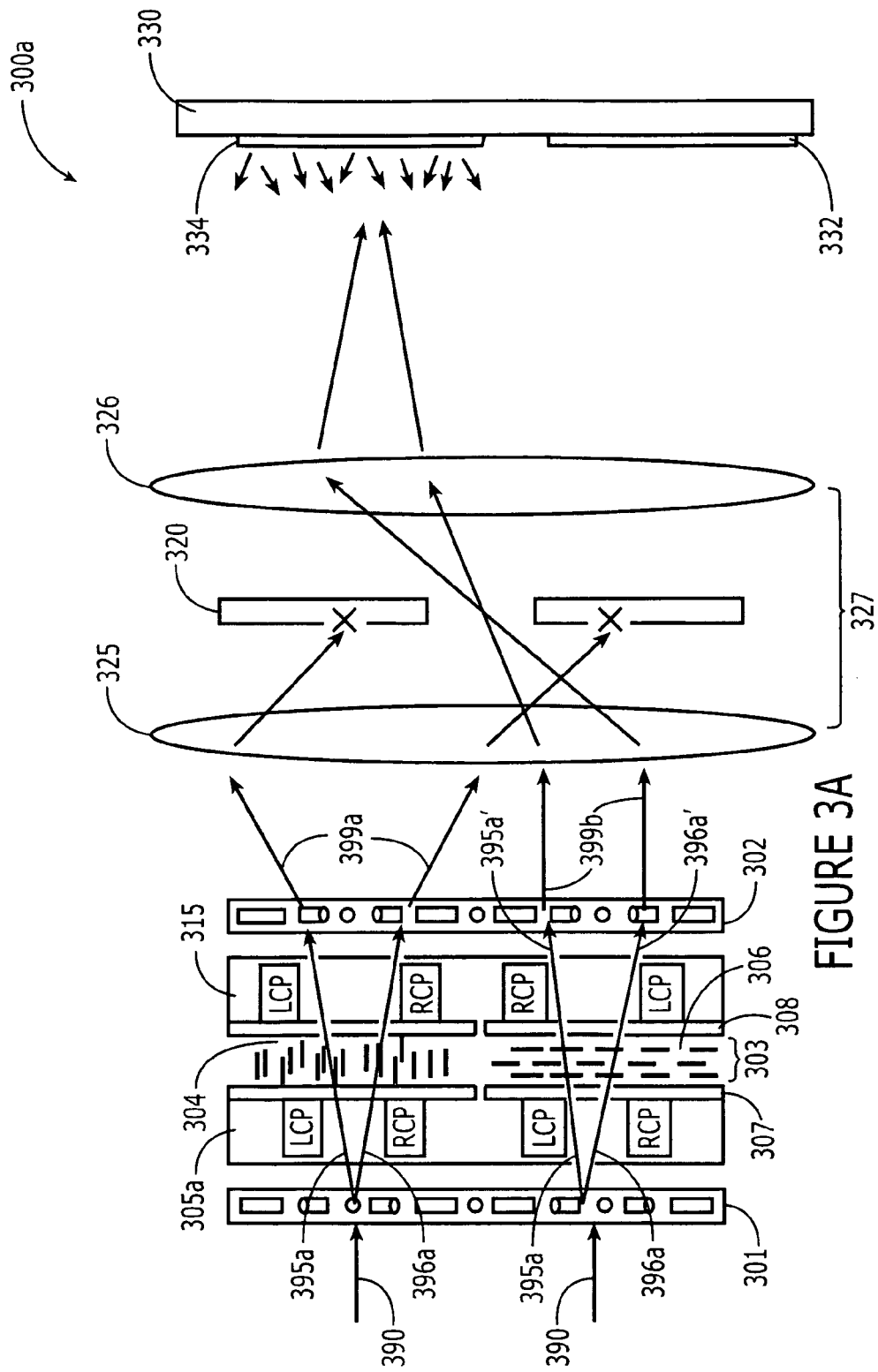
FIG. 3A is a block diagram illustrating projection-type liquid crystal display devices including multi-polarization grating arrangements according to some embodiments of the present invention.
Figure 3B:
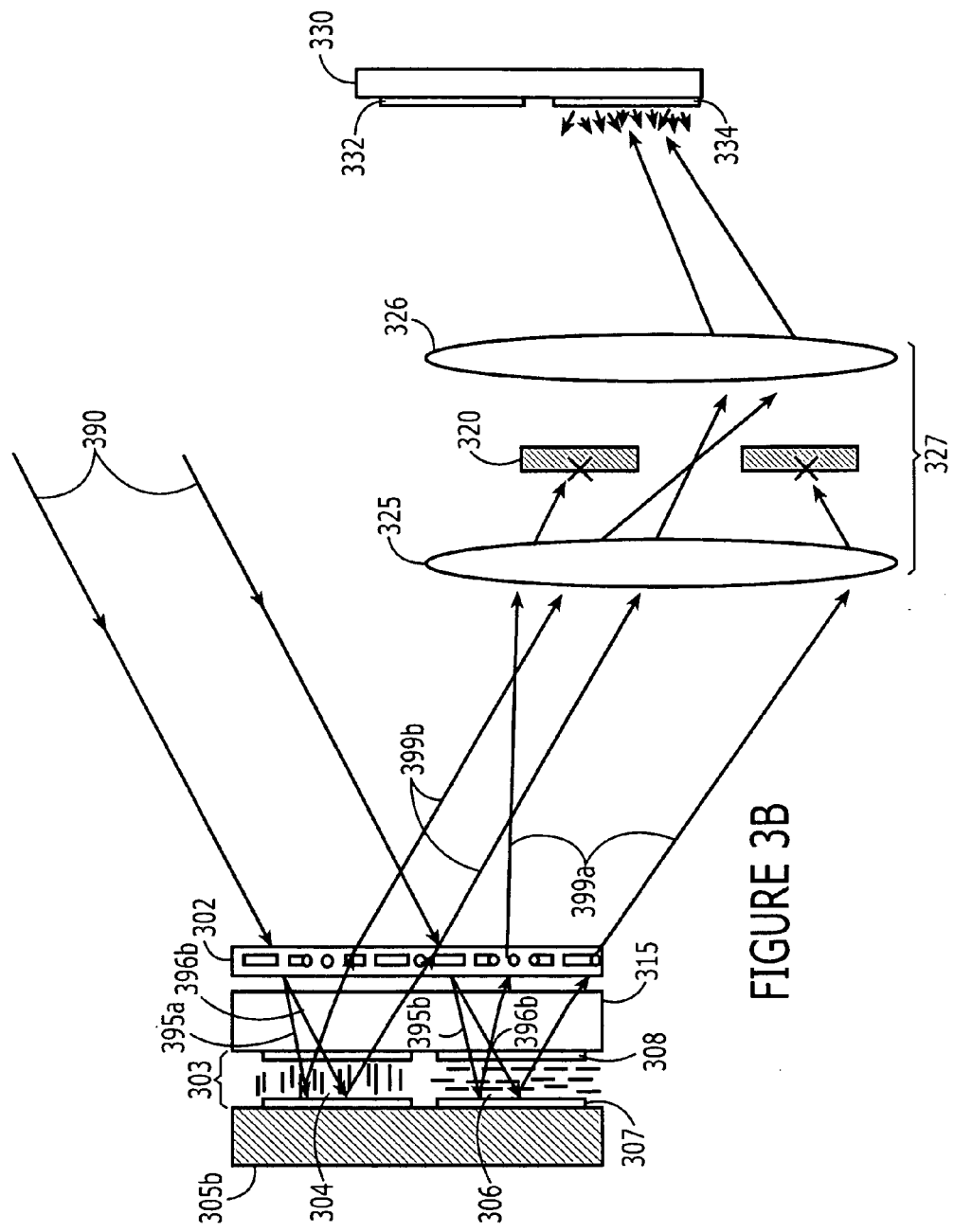
FIG. 3B is a block diagram illustrating projection-type liquid crystal display devices including multi-polarization grating arrangements and a reflective substrate in a non-telecentric configuration according to some embodiments of the present invention.
Figure 3C:
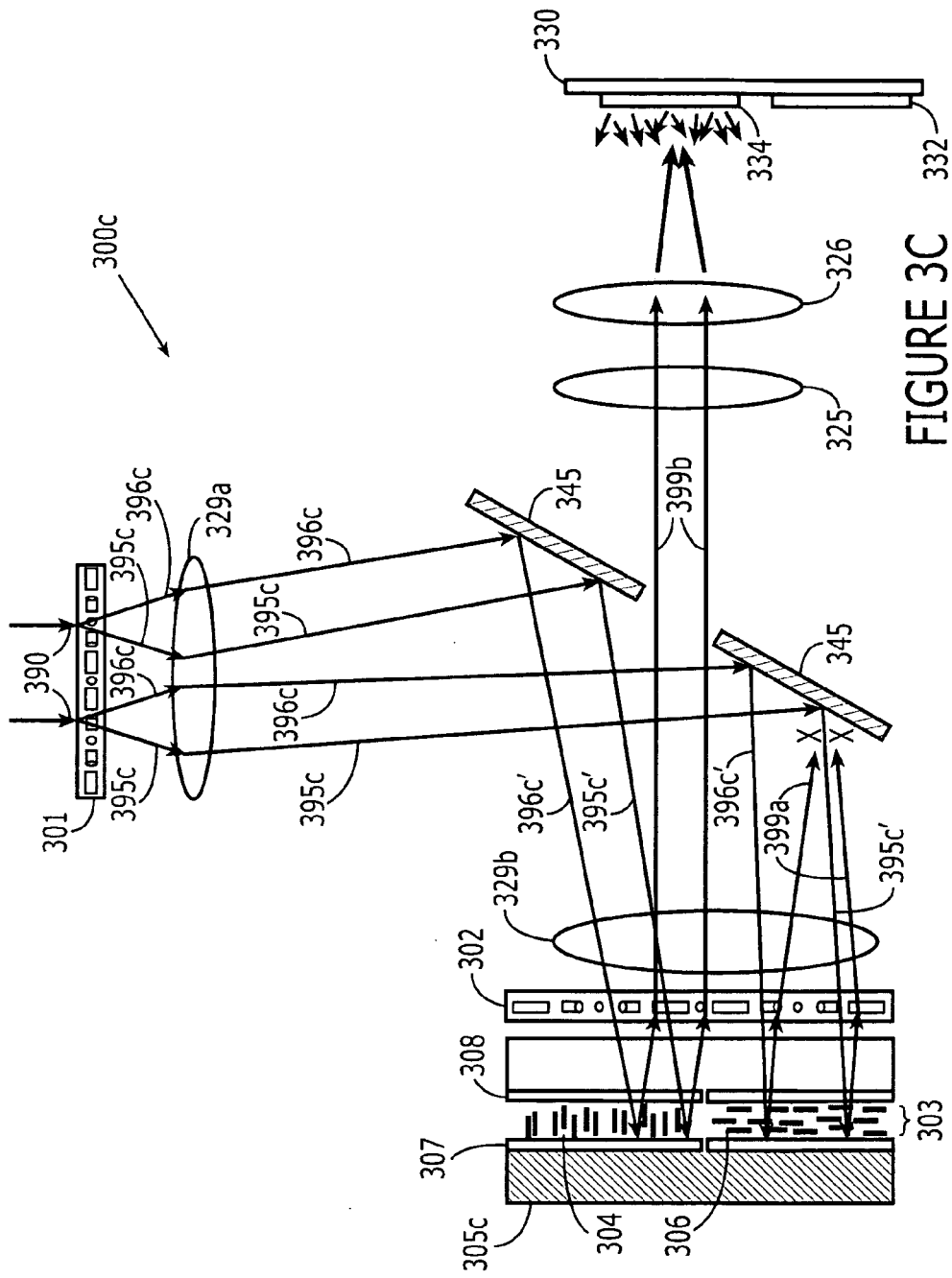
FIG. 3C is a block diagram illustrating projection-type liquid crystal display devices including multi-polarization grating arrangements and a reflective substrate in a telecentric configuration according to some embodiments of the present invention.

FIGS. 3A-3C illustrate multi-polarization grating arrangements according to some embodiments of the present invention as implemented in a projection system including a liquid crystal microdisplay. In particular, FIG. 3A illustrates a transmissive-mode projection-type LCD device 300a, while FIGS. 3B and 3C illustrate reflection-mode projection-type LCD devices 300b and 300c. The LCD devices 300a-300c respectively include first and second polarization gratings 301 and 302, substrates 305a/305b/305c and 315 including alignment layers 307 and 308 thereon, and a liquid crystal layer 303 between the substrates 305a/305b/305c and 315 and aligned according to the periodic alignment conditions provided by the alignment layers 307 and 308. The polarization gratings 301 and 302 have an antiparallel arrangement where the birefringence pattern of polarization grating 301 is inverted (i.e., rotated by about 180°) relative to that of polarization grating 302. The liquid crystal layer 303 defines a pixel array illustrated by way of example as including two pixels; however, the liquid crystal layer 303 may include fewer or more pixels in some embodiments of the present invention. The LCD devices 300a-300c further include an angle filtering stage 327 including projection lenses 325 and 326 and an aperture stop 320, and a viewing screen 330. The angle filtering stage 327 is configured to permit output light propagating in a direction substantially parallel to the input/incident light 390 (i.e., zero-order light) to be imaged on the viewing screen 330, but block output light that is not propagating direction parallel to the incident light 390 (i.e., first- and/or second-order light).

Example operations of the LCD devices 300a-300c will now be described. Referring now to FIG. 3A, the unpolarized incident light 390 enters the first polarization grating 301, and is polarized and diffracted into two orthogonal, circularly polarized beams 395a (left-handed circularly polarized) and 396a (right-handed circularly polarized) having different, non-zero-order propagation directions. Due to the diffraction efficiency of the polarization grating 301, the beams 395a and 396a may include all wavelengths of visible light, nearly 50% in each order. Both beams 395a and 396a pass through a transmissive substrate 305a and the LC layer 303, illustrated as including a first pixel 304 in the OFF state, and a second pixel 306 in the ON state. The beams 395a and 396a passing through the OFF pixel 304 do not experience a change in their respective polarizations, and are transmitted through a transmissive substrate 315 and then analyzed and diffracted by the second polarization grating 302 into output light 399a at greater angles relative to the angle of incidence of the unpolarized input light 390. This off-axis output light 399a is then blocked by the angle filtering stage 327, thereby preventing the light 399a from reaching the viewing screen 330. As such, a "dark" pixel 332 representing as little as 0% of the input light 390 is seen by a viewer.

In contrast, still referring to FIG. 3A, the beams 395a and 396a passing through the ON pixel 306 experience half-wave retardation, and are both converted into the opposite circular polarizations 395a' (right-handed circularly polarized) and 396a' (left-handed circularly polarized), respectively. The beams 395a' and 396a' are then diffracted by the second polarization grating 302 into output light 399b at an angle substantially similar to the original angle of incidence of the input light 390. This on-axis (i.e., zero-order) light 399b is permitted by the angle filtering stage 327 and projected and imaged on the viewing screen 330. As such, a "bright" pixel 334 representing up to 100% of the intensity/brightness of the input light 390 is presented to the viewer. Accordingly, nearly all of the light 399b from the ON pixel 306 is provided to the screen 330, while almost none of the light 399a from the OFF pixel 304 is provided to the screen 330. As such, when the LC layer 303 defines a pixel array including a plurality of pixels, the projector-type LCD device 300a of FIG. 3A may be used to project a viable image on the screen 330.

FIG. 3B illustrates a non-telecentric projection-type LCD device 300b that includes a reflective substrate 305b in place of the transmissive substrate 305a of FIG. 3A. Referring now to FIG. 3B, the unpolarized incident light 390 is similarly polarized and diffracted into two orthogonal, circularly polarized beams 395b (left-handed circularly polarized) and 396b (right-handed circularly polarized) by the polarization grating 302. The incident light 390 may be out-of-plane as compared to the diffraction direction in some embodiments. Both beams 395b and 396b pass through the transmissive substrate 315 and the LC layer 303. The beams 395b and 396b passing through the OFF pixel 304 of the liquid crystal layer 303 do not experience a change in their respective polarizations, but are reflected by the reflective substrate 305b into opposite polarizations back through the LC layer 303 and towards the polarization grating 302, which analyzes and diffracts the beams 395b and 396b to provide the on-axis output light 399b. The on-axis output light 399b is permitted by the angle filtering stage 327 and projected and imaged on the viewing screen 330 to present the bright pixel 334 to the viewer.

Still referring to FIG. 3B, the beams 395b and 396b passing through the ON pixel 306 experience half-wave retardation to provide beams of the opposite circular polarizations, which are reflected by the reflective substrate 305b back through the LC layer 303 and towards the polarization grating 302. More particularly, the LC layer of FIG. 3B may have a thickness of about half of that of the LC layer of FIG. 3A, and as such, may provide quarter-wave retardation of the beams 395b and 396b both before and after reflection by the reflective substrate 305b. The polarization grating 302 analyzes and diffracts the beams 395b and 396b to provide the off-axis output light 399a, which is blocked by the angle filtering stage 327, preventing the light 399a from reaching the viewing screen 330 and presenting the dark pixel 332 to the viewer.

FIG. 3C illustrates a telecentric projection-type LCD device 300c that includes a reflective substrate 305c in place of the transmissive substrate 305a of FIG. 3A. Referring now to FIG. 3C, the unpolarized incident light 390 is similarly polarized and diffracted into two orthogonal, circularly polarized beams 395c (left-handed circularly polarized) and 396c (right-handed circularly polarized) by the first polarization grating 301. The beams 395c and 396c are then directed by a lens 329a toward a reflective aperture stop 345, which reflects the beams into opposite polarizations and through a lens 329b towards the second polarization grating 302. The second polarization grating 302 analyzes and diffracts the beams 395c and 396c reflected by the reflective aperture stop 345, and both beams 395c and 396c pass through the transmissive substrate 315 and the LC layer 303. The beams 395c and 396c passing through the OFF pixel 304 of the liquid crystal layer 303 do not experience a change in their respective polarizations, but are reflected by the reflective substrate 305c into opposite polarizations back through the LC layer 303 and towards the second polarization grating 302, which again analyzes and diffracts the beams 395c and 396c to provide the off-axis output light 399a. The off-axis output light 399a is blocked by the reflective aperture stop 345, preventing the light 399a from reaching the viewing screen 330 and presenting the dark pixel 332 to the viewer.

Still referring to FIG. 3C, the beams 395c and 396c passing through the ON pixel 306 experience half-wave retardation to provide beams of the opposite circular polarizations, which are reflected by the reflective substrate 305b back through the LC layer 303 and towards the second polarization grating 302. More particularly, the LC layer 303 provides quarter-wave retardation of the beams 395c and 396c both before and after reflection by the reflective substrate 305c. The second polarization grating 302 again analyzes and diffracts the beams 395c and 396c to provide the on-axis output light 399b, which is permitted by the reflective aperture stop 345 and projected and imaged on the viewing screen 330 by the projection lenses 325/326 to present the bright pixel 334 to the viewer.

Accordingly, some embodiments of the present invention as described above with reference to FIGS. 3A-3C may provide projection-based LCD devices that may have twice the brightness of conventional LCD devices. Also, the polarization gratings 301 and/or 302 may be achromatic to achieve relatively high contrast for a broad wavelength range including red, green, and blue light. Although illustrated as including the transmissive substrates 305a and 315 between the polarization gratings 301 and 302 in FIG. 3A, it is to be understood that the polarization gratings 301 and 302 may be provided between the substrates 305a and 315 in some embodiments, as similarly illustrated in FIGS. 1A and 1B. Furthermore, although illustrated with reference to unpolarized input light 390, it is to be understood that polarized input light may be used in the projection systems of FIGS. 3A-3C in some embodiments. Also, well-known retardation compensation techniques may be used in conjunction with the arrangements illustrated in FIGS. 3A-3C.

Figure 4A:
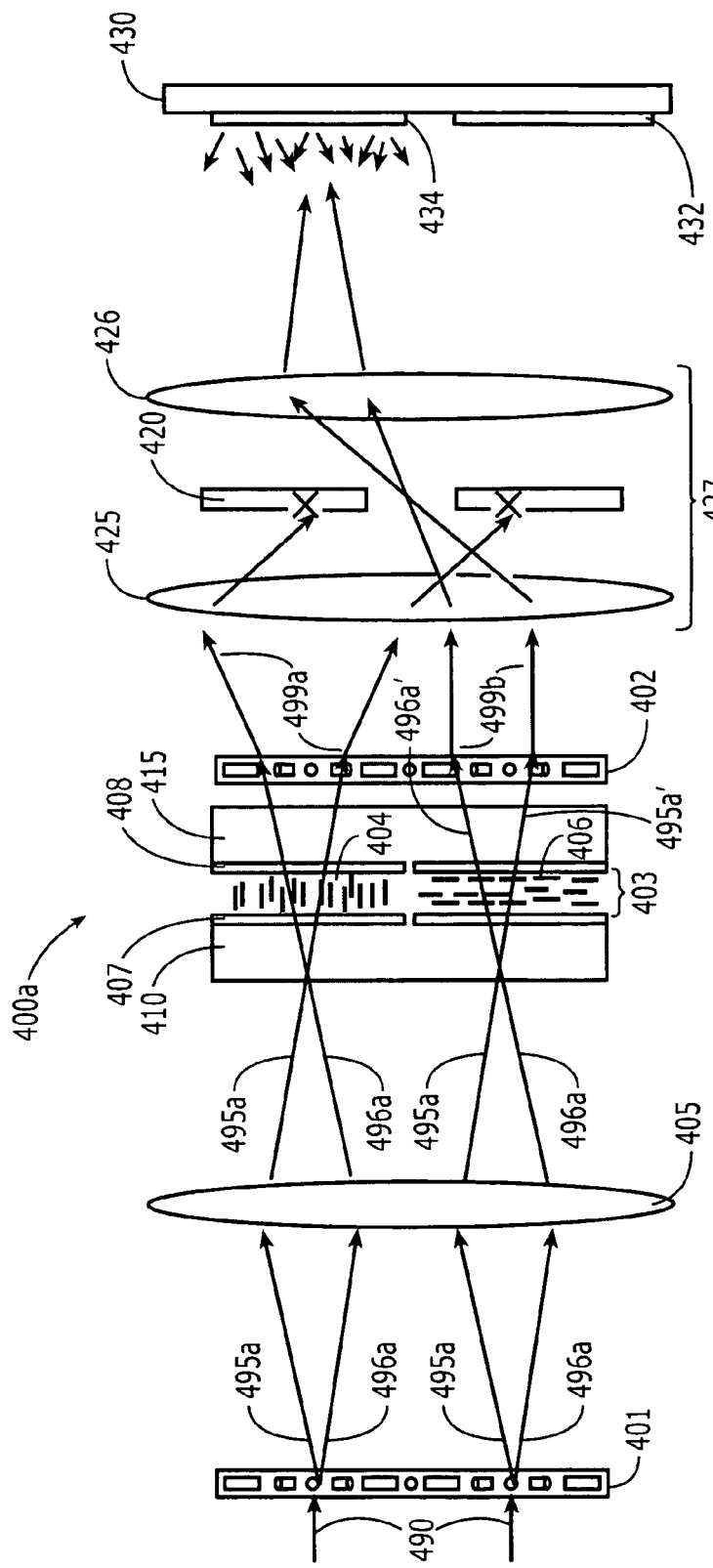
FIGS. 4A and 4B are block diagrams illustrating projection-type liquid crystal display devices including multi-polarization grating arrangements according to further embodiments of the present invention.
Figure 4B:
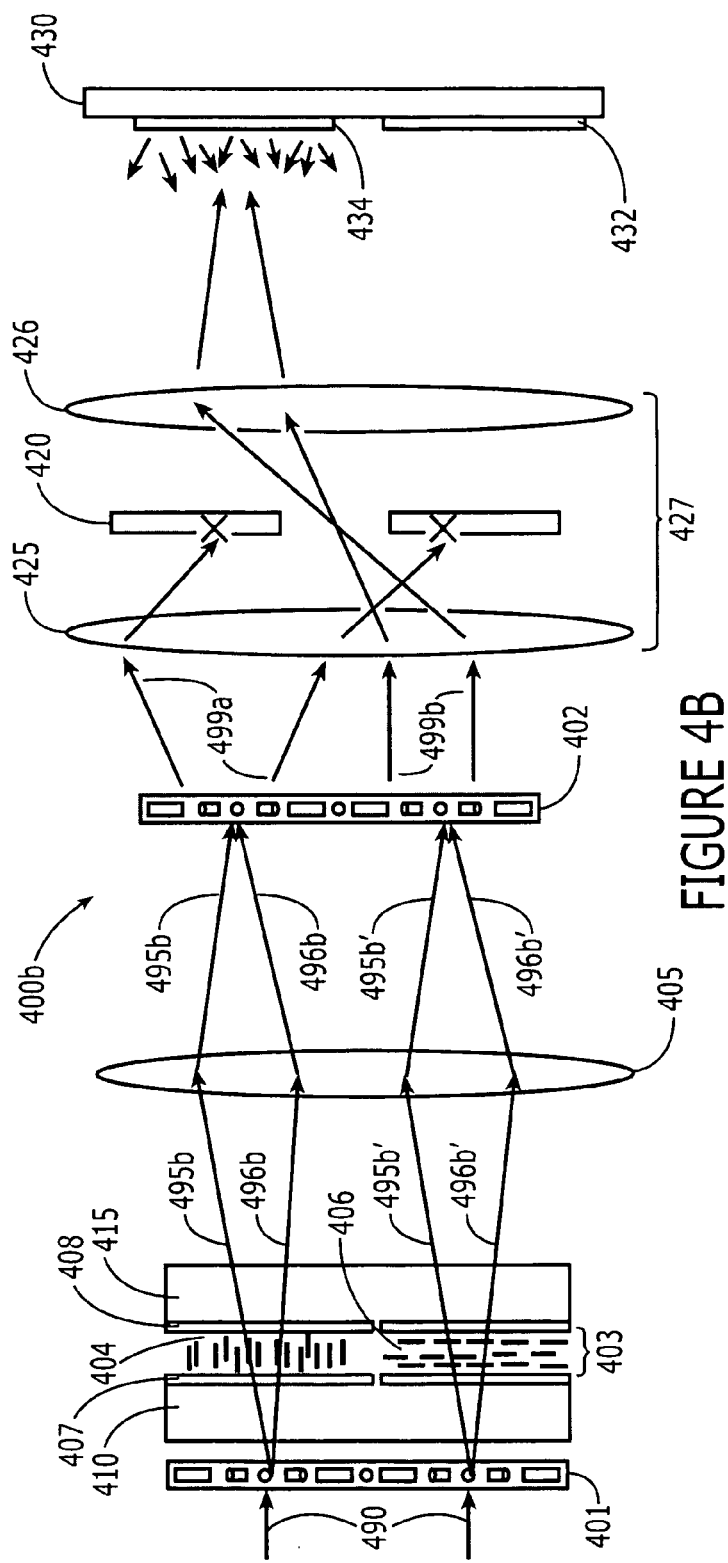

FIGS. 4A and 4B illustrate multi-polarization grating arrangements implemented in projection systems 400a and 400b, respectively, according to further embodiments of the present invention. In particular, the LCD devices 400a and 400b each include first and second polarization gratings 401 and 402, substrates 410 and 415 including alignment layers 407 and 408 thereon, and a liquid crystal layer 403 between the substrates 410 and 415 and aligned according to the periodic alignment conditions provided by the alignment layers 407 and 408. The polarization gratings 401 and 402 have a parallel arrangement where the birefringence pattern of polarization grating 401 has the same orientation as that of polarization grating 402. The liquid crystal layer 403 defines a pixel array illustrated by way of example as including two pixels; however, the liquid crystal layer 403 may include fewer or more pixels in some embodiments of the present invention. The LCD devices 400a-400b further include an angle filtering stage 427 including projection lenses 425 and 426 and an aperture stop 420, and a viewing screen 430. The angle filtering stage 427 is configured to permit output light propagating in a direction substantially parallel to the incident light 490 (i.e., zero-order light) to be imaged on the viewing screen 430, but block output light that is not propagating direction parallel to the incident light 490 (i.e., first- and/or second-order light).

In many projection display designs, the input light from a light source is provided on-axis, and the image from the microdisplay may be collected by the projection lens in either the bright-field (i.e., zero-order, on-axis light) or the dark field (first-order, off-axis light). Accordingly, such designs may arrange the projection optics in a telecentric configuration such that light propagates normal to the field of view, and may collect the zero-order (i.e., on-axis) light with a relatively small aperture. In contrast, some embodiments of the present invention as illustrated in FIGS. 4A and 4B provide improved contrast (and thus image quality) by using a projection lens or micro lens array 405 to collect the first-order (i.e., off-axis) diffracted light. When the incident light 490 is arranged to enter the LC layer 403 off-axis (i.e., at first- and/or second-order angles), the properties of the bright pixel and dark pixel configurations may be inverted. In other words, better contrast may be observed in the on-axis light.

FIG. 4A illustrates a LCD device 400a that further includes the lens 405 as an imaging source for providing off-axis light to the liquid crystal layer 403 and the second polarization grating 402. In particular, unpolarized light 490 enters the first polarization grating 401, and is polarized and diffracted into two orthogonal, circularly polarized beams 495a (left-handed circularly polarized) and 496a (right-handed circularly polarized) having different, non-zero-order propagation directions. Due to the diffraction efficiency of the polarization grating 401, the beams 495a and 496a may each include red, green, and blue light, nearly 50% in each order. The lens 405 images the beams 495a and 496a to provide symmetric off-axis input light into the liquid crystal layer 403 and the second polarization grating 402. Both beams 495a and 496a pass through a transmissive substrate 410 the LC layer 403, illustrated as including a first pixel 404 in the OFF state, and a second pixel 406 in the ON state. The beams 495a and 496a passing through the OFF pixel 404 do not experience a change in their respective polarizations, and are transmitted through a transmissive substrate 415 and then analyzed and diffracted by the second polarization grating 402 into output light 499a at greater angles relative to the angle of incidence of the incident unpolarized light 490. This off-axis output light 499a is blocked by the angle filtering stage 427, thereby preventing the light 499a from reaching the viewing screen 430. As such, a "dark" pixel 432 representing as little as 0% of the input light 490 is seen by a viewer.

In contrast, the beams 495a and 496a passing through the ON pixel 406 experience half-wave retardation, and are both converted into the opposite circular polarizations 495a' (right-handed circularly polarized) and 496a' (left-handed circularly polarized), respectively. The beams 495a' and 496a' are then analyzed and diffracted by the second polarization grating 402 into output light 499b at an angle substantially similar to the original angle of incidence of the input light 490. This on-axis (i.e., zero-order) light 499b is permitted by the angle filtering stage 427 and projected and imaged on the viewing screen 430. As such, a "bright" pixel 434 representing up to 100% of the intensity/brightness of the input light 490 is presented to the viewer.

FIG. 4B illustrates a similar LCD device 400b that arranges the lens 405 after the liquid crystal layer 403 to provide the off-axis light to the second polarization grating 402. As such, as similarly described above with reference to FIG. 4A, the unpolarized input light 490 is polarized and diffracted into two orthogonal, circularly polarized beams 495b (left-handed circularly polarized) and 496b (right-handed circularly polarized) by the first polarization grating 401 having different directions of propagation relative to that of the incident light 490. The beams 495b and 496b pass through the transmissive substrate 410 and the liquid crystal layer 403. The beams 495b and 496b passing through the OFF pixel 404 of the liquid crystal layer 403 do not experience a change in their respective polarizations, while the beams 495b and 496b passing through the ON pixel 406 experience half-wave retardation to provide beams of the opposite circular polarizations 495b' (right-handed circularly polarized) and 496b' (left-handed circularly polarized), respectively. The lens 405 images the beams 495b-496b and/or 495b'-496b' to provide symmetric off-axis input light into the second polarization grating 402. The beams 495b and 496b are analyzed and diffracted by the second polarization grating 402 to provide the off-axis output light 499a, which is blocked by the angle filtering stage 427. The beams 495b' and 496b' are analyzed and diffracted by the second polarization grating 402 to provide the on-axis output light 499b, which is provided to the viewing screen 430 via the angle filtering stage 427, as similarly described with reference to FIG. 4A.

Accordingly, some embodiments of the present invention as described above with reference to FIGS. 4A and 4B may provide projection-based LCD devices that may have improved contrast over conventional LCD devices. Although illustrated with reference to unpolarized input light 490, it is to be understood that polarized input light may be used in the projection systems of FIGS. 4A and 4B in some embodiments. Also, in some embodiments, switchable liquid crystal polarization gratings, such as those described in PCT Application No. PCT/US2008/004888 to Escuti, et al., may be used in place of the LC layer 403, the substrates 410 and 415, and the polarization grating 402. Thus, such embodiments provide a sequential arrangement of the polarization gratings 401 and 402, where at least one of the polarization gratings 401 and 402 is configured to be switched between a first state that does not substantially alter respective polarizations and/or propagation directions of the light traveling therethrough, and a second state that alters the respective polarizations and propagation directions of the light traveling therethrough. The other of the polarization gratings 401 and 402 may be a fixed or non-switchable grating configured to polarize and diffract input light, as discussed above. In other words, some embodiments of the present invention may include a sequential arrangement of two polarization gratings, one or more of which may be switchable, and one or more of which could be pixelated.

Figure 5:
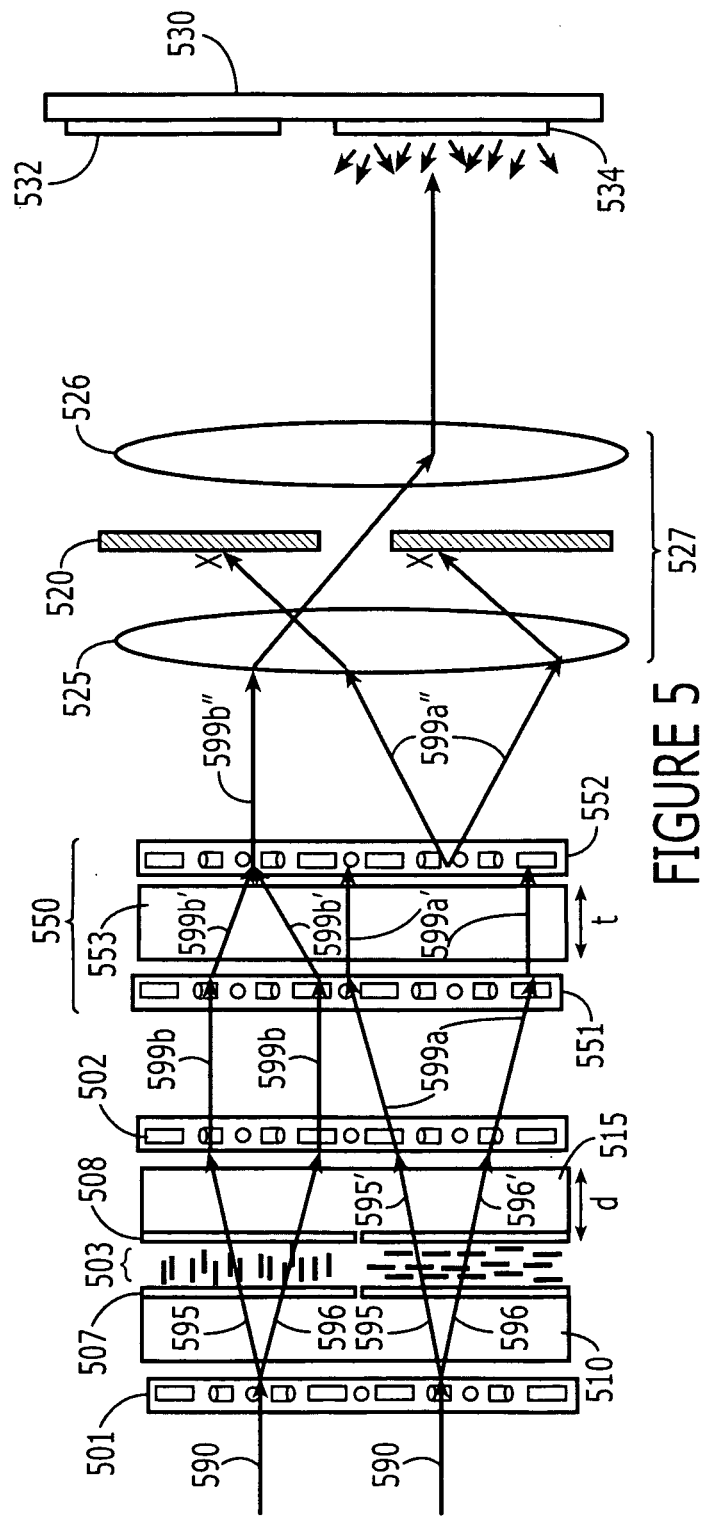
FIG. 5 is a block diagram illustrating projection-type liquid crystal display devices including multi-polarization grating arrangements and an offset compensator according to still further embodiments of the present invention.

FIG. 5 illustrates a multi-polarization grating arrangement implemented in projection system 500 according to still further embodiments of the present invention. In particular, the LCD device 500 includes first and second polarization gratings 501 and 502, substrates 510 and 515 including alignment layers 507 and 508 thereon, and a liquid crystal layer 503 between the substrates 510 and 515 and aligned according to the periodic alignment conditions provided by the alignment layers 507 and 508. The polarization gratings 501 and 502 have a parallel arrangement. The liquid crystal layer 503 defines a pixel array illustrated by way of example as including two pixels; however, the liquid crystal layer 503 may include fewer or more pixels in some embodiments of the present invention. The LCD device 500 further includes an angle filtering stage 527 including projection lenses 525 and 526 and an aperture stop 520, and a viewing screen 530. The angle filtering stage 527 is configured to permit output light propagating in a direction substantially parallel to the incident light 590 (i.e., zero-order light) to be imaged on the viewing screen 530, but block output light that is not propagating direction parallel to the incident light 590 (i.e., first- and/or second-order light).

Still referring to FIG. 5, the LCD device 500 further includes an offset compensator 550 after the first and second polarization gratings 501 and 502. The offset compensator 550 includes third and fourth polarization gratings 551 and 552, and an intermediate layer 553 therebetween. The intermediate layer 553 has a thickness t substantially similar to the distance d between the liquid crystal layer 503 and the second polarization grating 502 and may be a transmissive substrate in some embodiments. The polarization gratings 551 and 552 have a parallel arrangement such that the local nematic director orientation of polarization grating 551 is of the same handedness as that of polarization grating 552. The offset compensator 550 is configured to substantially reduce and/or remove the spatial offset of the output light transmitted by the polarization grating 502 without substantially altering the directions of propagation thereof, and provide this light to the angle filtering stage 527 for imaging on the viewing screen 530. In other words, an offset compensator 550 having an intermediate layer 553 with a thickness t may improve parallax issues resulting from the spatial offset of the light from the polarization grating 502.

More particularly, as shown in FIG. 5, the unpolarized input light 590 is polarized and diffracted into two orthogonal, circularly polarized beams 595 (left-handed circularly polarized) and 596 (right-handed circularly polarized) by the first polarization grating 501. The beams 595 and 596 passing through the OFF pixel 504 of the liquid crystal layer 503 do not experience a change in their respective polarizations, while the beams 595 and 596 passing through the ON pixel 506 experience half-wave retardation to provide beams of the opposite circular polarizations 595' (right-handed circularly polarized) and 596' (left-handed circularly polarized), respectively. The beams 595' and 596' are analyzed and diffracted by the second polarization grating 502 to transmit off-axis output light 599a, while the beams 595 and 596 are analyzed and diffracted by the second polarization grating 502 to transmit on-axis output light 599b.

The third polarization grating 551 receives light transmitted from the second polarization grating 502 and diffracts the on- and off-axis beams 599b and 599a to off- and on-axis 599b' and 599a', respectively. The intermediate layer 553 transmits both beams 599b' and 599a' to the fourth polarization grating 552 through the thickness t without substantially altering their directions of propagation. The fourth polarization grating 552 diffracts the on- and off-axis beams 599b' and 599a' back to the off- and on-axis beams 599b" and 599a", respectively, to provide offset-compensated output light with the same polarization and direction as the beams 599b and 599a transmitted from the second polarization grating 502, but with a reduced spatial offset. In particular, the thickness of the intermediate layer produces a spatial offset to compensate for the offset that results from the distance d between the liquid crystal layer 503 and the second polarization grating 502, which causes the parallax problem. As such, off-axis output light 599a" is blocked by the angle filtering stage 527 to present the dark pixel 532 to the viewer, while on-axis output light 599b" is permitted by the angle filtering stage 527 and projected and imaged on the viewing screen 530 to present the bright pixel 534 to the viewer.

In some embodiments, the intermediate layer 553 may be a substrate that is similar to the transparent substrate 515 between the liquid crystal layer 503 and the second polarization grating 502 (i.e., having the same thickness and/or the same refractive index). The optical path length of the first and second beams within the intermediate layer 553 may be matched to that of the first and second beams within the transparent substrate 515. This optical path length may depend on the diffraction angle, the thickness t, and/or the optical (refractive) index of the material of the intermediate layer 553. In some embodiments, the intermediate layer 553 may be an isotropic and transparent medium, such as glass.

Figure 6:
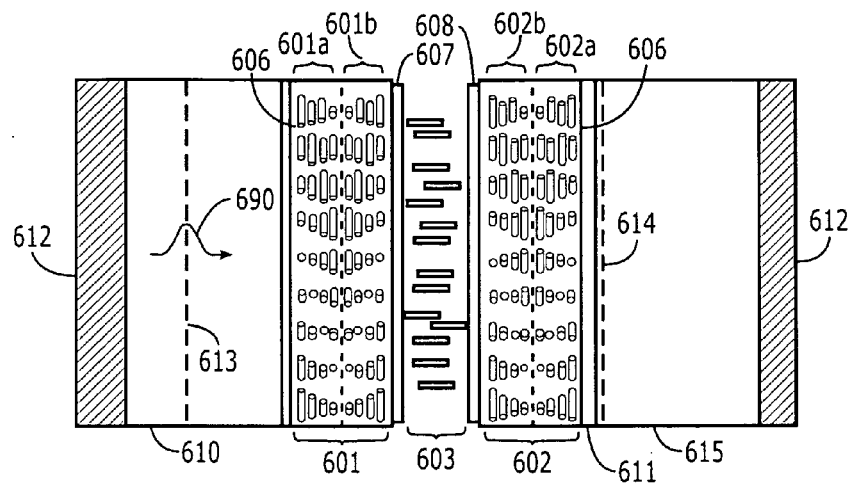
FIG. 6 is a diagram illustrates an example simulation space for polarization grating arrangements according to some embodiments of the present invention.

FIG. 6 illustrates an example simulation space for polarization grating arrangements according to some embodiments of the present invention used to provide the simulation data of FIGS. 7A-7G. Referring now to FIG. 6, a uniform planar liquid crystal layer 603 including homogeneously aligned LC molecules is provided between alignment layers 607 and 608 on achromatic polarization gratings 601 and 602, and the polarization gratings 601 and 602 are provided between transmissive substrates 610 and 615. The LC layer 603 is configured to be switched between an "OFF" state, which provides no retardation of the input light, and an "ON" state, which provides half-wave retardation of the input light, in response to a voltage applied thereto. Characteristics of the LC layer 603 include a thickness d (as measured along a direction between opposing surfaces of the polarization gratings 601 and 602) of about 1.7 µm, an ordinary index of refraction $n_o$ of about 1.42, and a linear birefringence Δn of about 0.159.

The polarization grating 601 includes two polarization grating layers 601a and 601b. The polarization grating layers 601a and 601b include chiral molecules (i.e., asymmetric molecules having different left-handed and right-handed forms) of opposite handedness. As such, the orientation of the molecules of the polarization grating layer 601a is rotated or "twisted" by a twist angle Φ of −70° over a thicknesses thereof to provide a continuous phase shift in its local anisotropy pattern. The orientation of the molecules of the polarization grating layer 601b is oppositely twisted by a twist angle Φ of +70° over a thicknesses thereof As such, the polarization grating 601 includes two polarization grating layers 601a and 601b of opposite twist sense. The polarization grating 602 similarly includes two polarization grating layers 602a and 602b having opposite twist angles Φ of −70° and +70°, respectively. Other characteristics of each of the polarization gratings 601 and 602 include an optical pitch of about 1-4 µm, an ordinary index of refraction $n_o$ of about 1.42, a linear birefringence Δn of about 0.159, and an antiparallel arrangement.

Gradient-index anti-reflection (AR) coatings 606 are applied to the polarization gratings 601 and 602 at the interfaces with the transmissive substrates 610 and 615, respectively. Periodic boundaries 611 and matched layer boundaries 612 using the Uniaxial Perfectly Matched Layer (UPML) technique may be employed to terminate the simulation space and/or to reduce simulation time. The input/incident light 609 is a Gaussian pulse having a center wavelength $\lambda_0$ of about 550 nm provided at a line 613 before the polarization grating 601, and the output diffraction efficiencies may be calculated from the electric field at a line 614 immediately after the polarization grating 602. The polarization gratings 601 and 602 have a grid spacing of $\lambda_0/40=13.75$ nm, also referred to as a grid density N of 40.

FIGS. 7A-7G illustrate simulation results showing diffraction properties for polarization grating arrangements according to some embodiments of the present invention in response to varying the tilt angle $\theta_{tilt}$ of the molecules of the LC layer 603 over a range of about 0° to about 90° by changing the applied voltage to the LC layer 603. More particularly, FIGS.

7A-7F illustrate the zero, first, and second order diffraction efficiencies as a function of normalized retardation (Δnd/λ) for different tilt angles ($θ_{tilt}$) 90°, 60°, 45°, 30°, 15°, and 0°, respectively, relative to the opposing faces of the polarization gratings 601 and 602. The sum of the zero-order diffraction efficiencies are respectively represented by waveforms 700a-700f in FIGS. 7A-7F, and indicate light output from the polarization grating arrangement that propagates at an angle substantially parallel to that of the input light 690. Likewise, in FIGS. 7A-7F, the sum of the first-order diffraction efficiencies (indicating light output from the polarization grating arrangement that propagates at different angles than that of the input light 690) are represented by waveforms 701a-701f, and the sum of the second-order diffraction efficiencies (indicating light output from the polarization grating arrangement that propagates at even greater angles relative to that of the input light 690) are represented by waveforms 702a-702f.

Figure 7A:
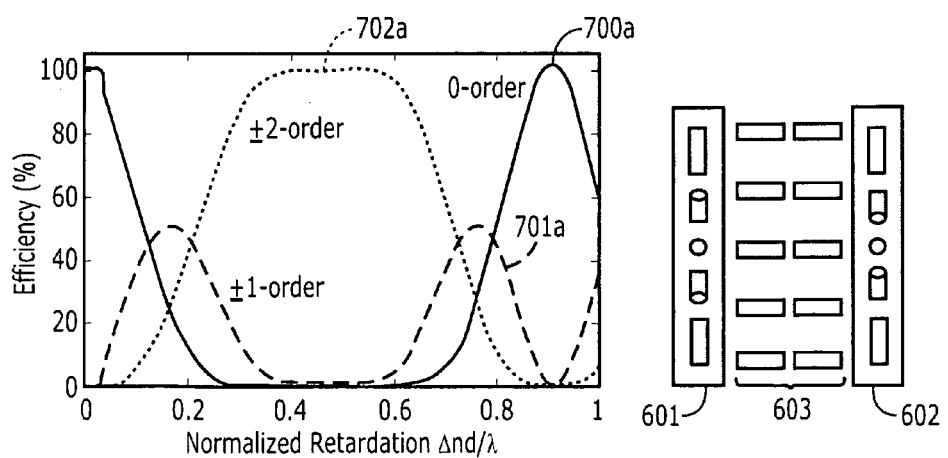
FIGS. 7A-7G are graphs illustrating simulation results for polarization grating arrangements according to the simulation space of FIG. 6.
Figure 7B:
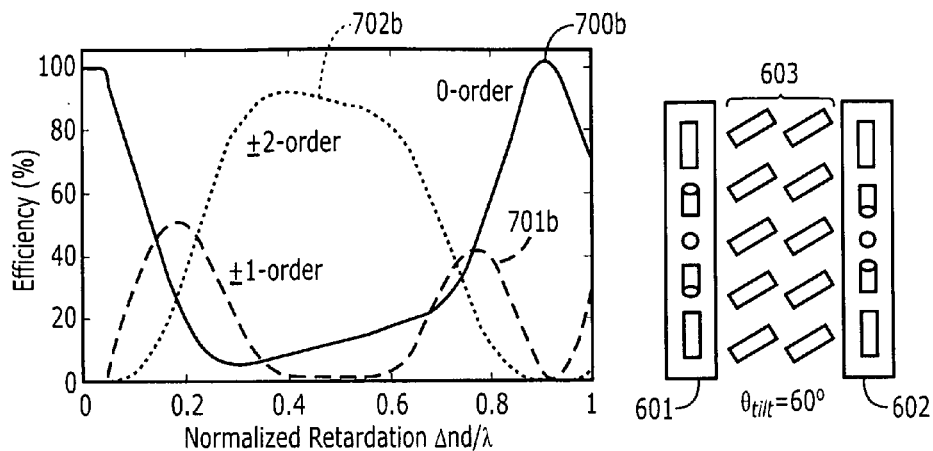
Figure 7C:
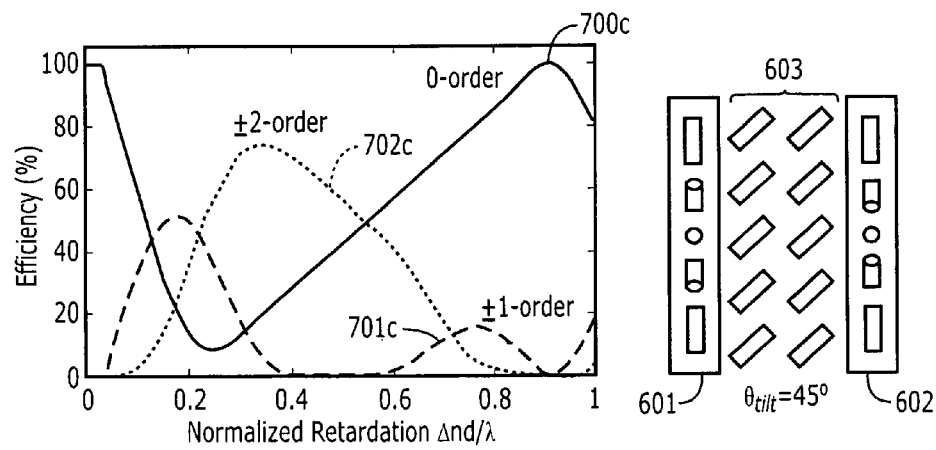
Figure 7D:
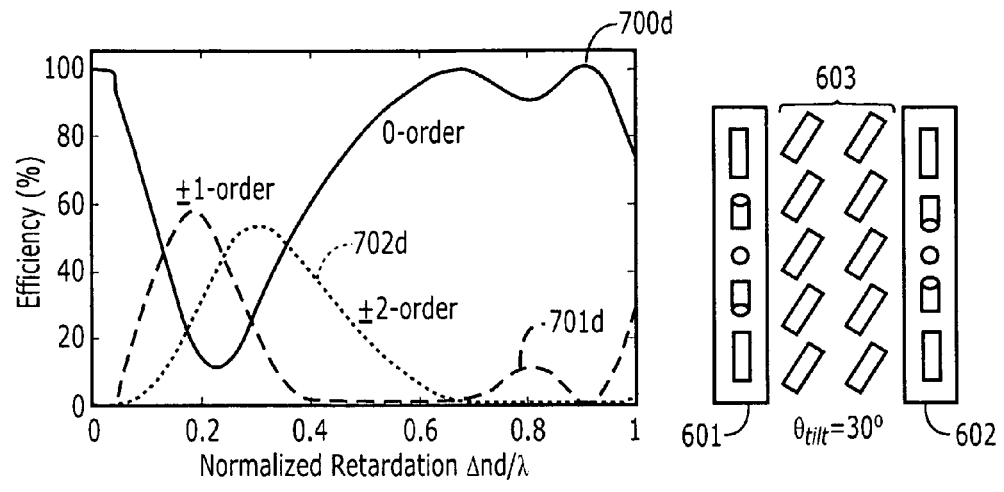
Figure 7E:
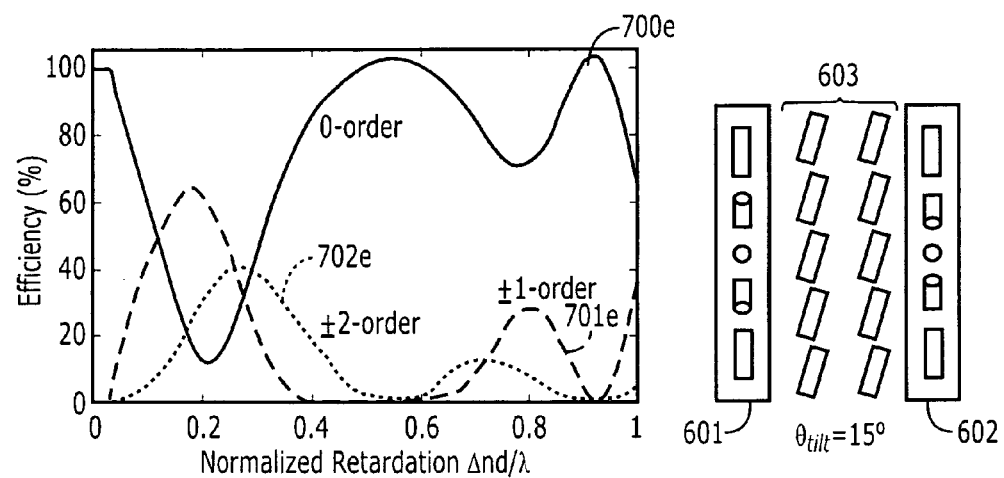
Figure 7F:
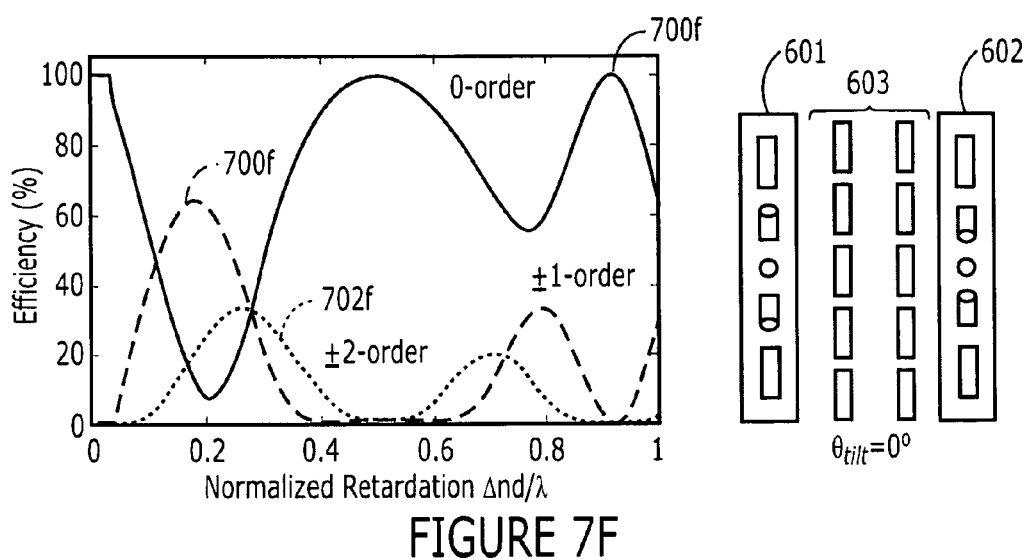
Figure 7G:
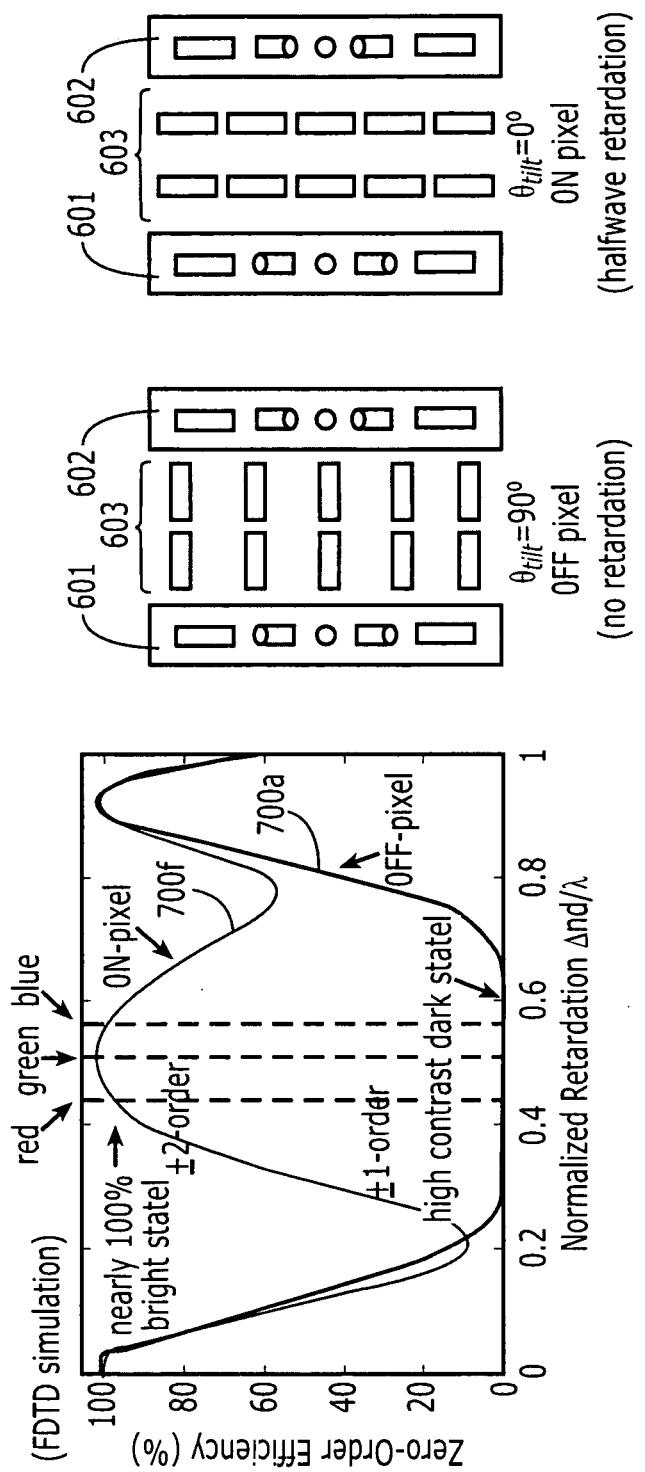

As shown in FIG. 7A, a relatively high diffraction efficiency is provided for light diffracted into the second-order when the LC layer 603 is in the "OFF" state (i.e., where $θ_{tilt}$=90°) over a wavelength range of about 400 nm to 700 nm, which includes blue, green, and red light. Accordingly, this second-order output light can be blocked and/or otherwise prevented from being transmitted to a viewing screen, as discussed above. In contrast, as shown in FIG. 7F, a relatively high diffraction efficiency is provided for the zero-order light when the LC layer 603 is in the "ON" state (i.e., where $θ_{tilt}$=0°) over a similar wavelength range. This zero-order output light may thereby be provided to a viewing screen with little to no polarization-related losses. FIG. 7G illustrates the zero-order diffraction efficiency of polarization grating arrangements according to some embodiments of the present invention by superimposing the zero-order efficiency 700a for $θ_{tilt}$=90° of FIG. 7A with the zero-order efficiency 700f for $θ_{tilt}$=0° of FIG. 7F. Thus, embodiments of the present invention may provide both increased brightness (as indicated by 700f) and high contrast (as indicated by 700a) over a relatively wide range of the spectrum.

Figure 8A:
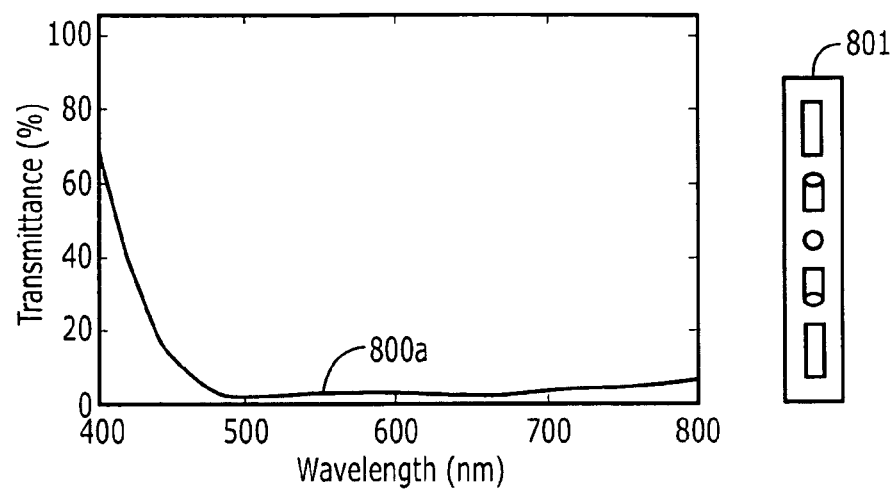
FIGS. 8A-8F are graphs illustrating experimental results for polarization grating arrangements according to some embodiments of the present invention.
Figure 8B:
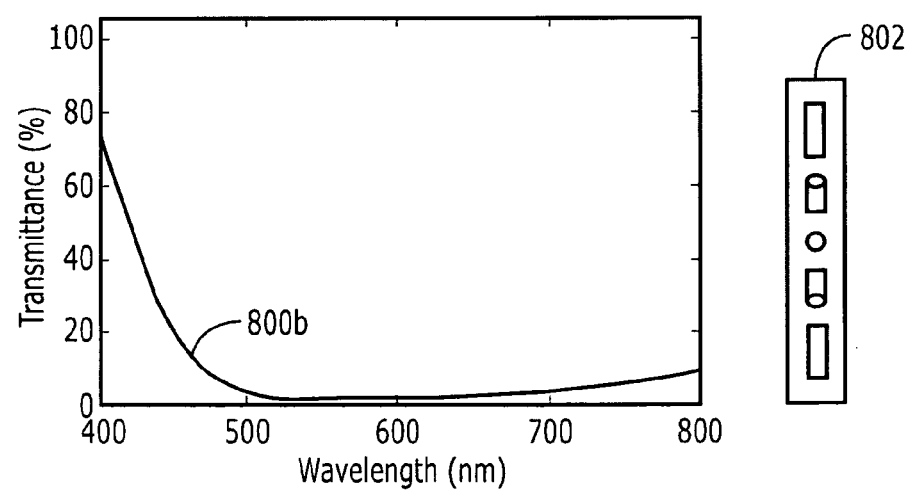
Figure 8C:
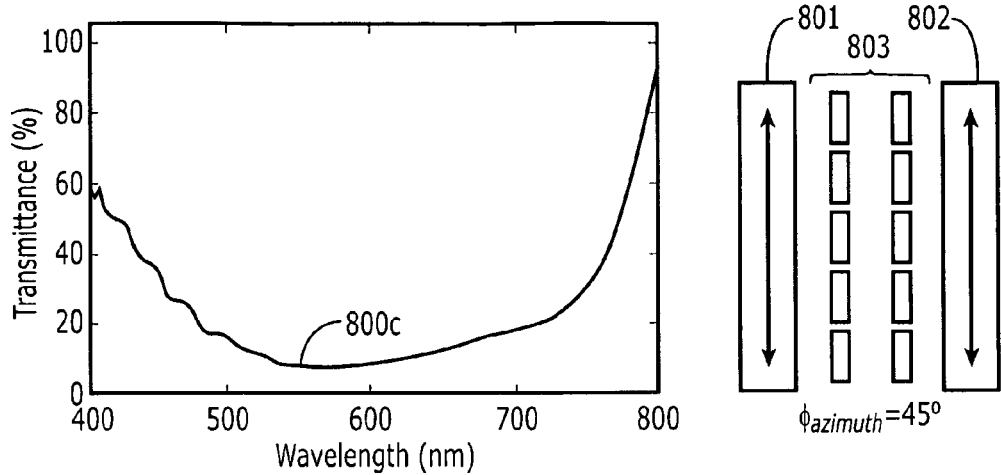
Figure 8D:
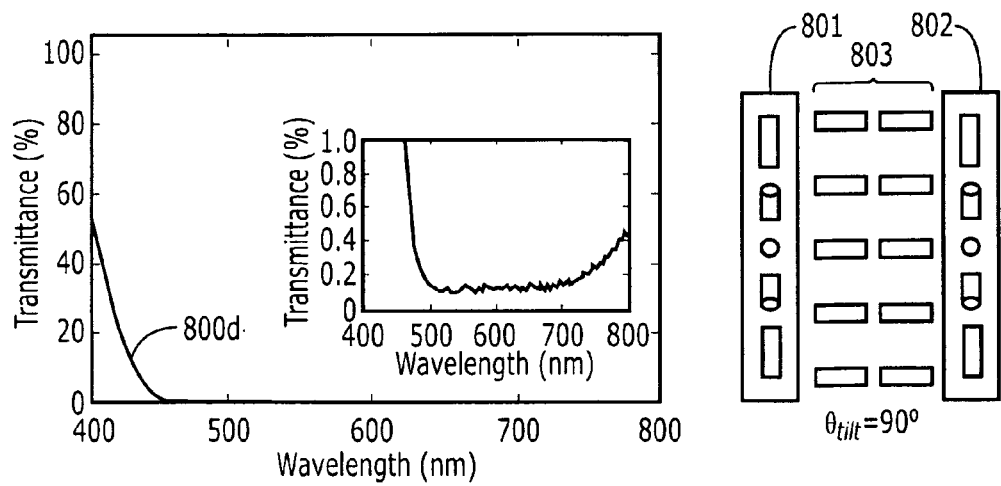
Figure 8E:
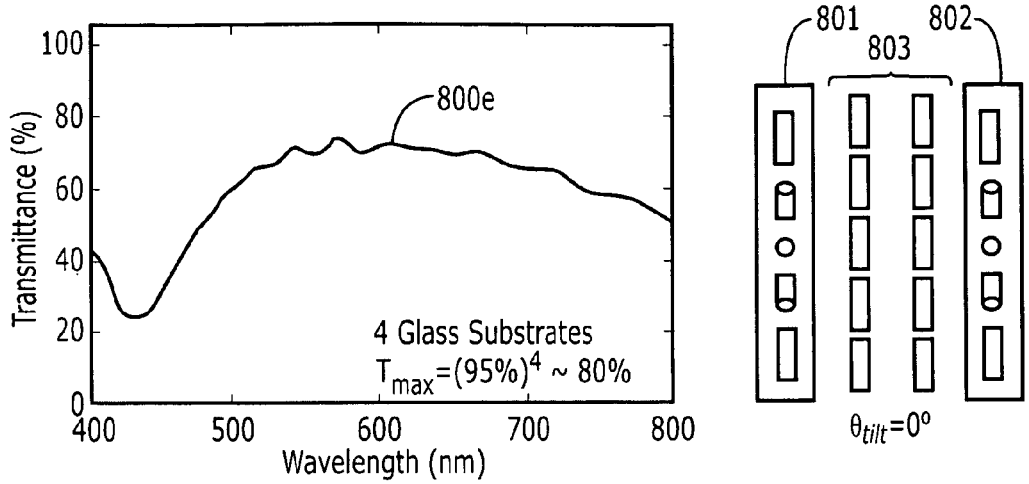
Figure 8F:
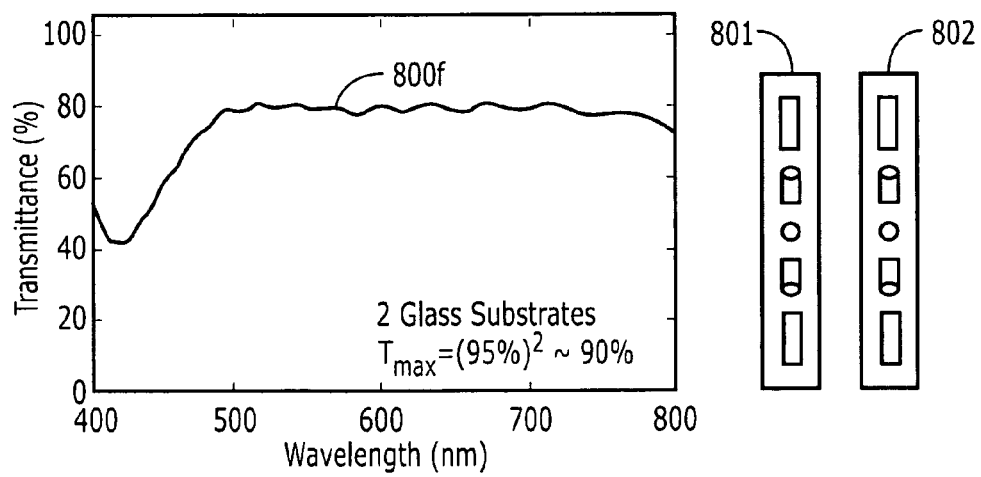

FIGS. 8A-8F provide experimental results illustrating transmission spectra for polarization grating arrangements according to some embodiments of the present invention. In particular, FIGS. 8A-8F illustrate transmittance vs. wavelength characteristics as measured by a spectraphotometer for a polarization grating arrangement including a homogeneous liquid crystal layer 803 with a half-wave retardation thickness between two reactive mesogen achromatic polarization gratings 801 and 802. The liquid crystal layer has an ordinary index of refraction $n_o$ of about 1.49, a linear birefringence Δn of about 0.11, and a thickness of about 2.8 μm. The polarization gratings have an ordinary index of refraction $n_o$ of about 1.45, and a linear birefringence Δn of about 0.159. As shown in FIGS. 8A and 8B, the waveforms 800a and 800b illustrate the individual zero-order transmittances of the polarization gratings 801 and 802, respectively, prior to assembly with an LC layer 803. As such, the polarization gratings 801 and 802 diffract incident light into non-zero-order light with an efficiency of nearly 100%. FIG. 8F illustrates the zero-order transmittance for an arrangement including the combination of the polarization gratings 801 and 802 in sequence. The first polarization grating 801 is used to polarize and diffract the incident light away from the angle of incidence, and the second polarization grating 802 is used to analyze and diffract the light back to the angle of incidence to provide a transmittance of about 80% or more of the incident light, as shown by the waveform 800f. The waveform 800c in FIG. 8C illustrates the zero order transmittance of a polarization grating arrangement in accordance with some embodiments of the present invention including a liquid crystal layer 803 having a tilt angle of 0° and an azimuth angle of 45° between parallel polarization gratings 801 and 802. FIGS. 8D and 8E likewise illustrate zero-order transmittance characteristics for an antiparallel arrangement of the polarization gratings 801 and 802 where the liquid crystal layer 803 has a tilt angle of 90° and 0°, as shown by waveforms 800d and 800e, respectively.

Accordingly, some embodiments of the present invention provide multi-polarization grating arrangements where diffraction is performed by the polarization gratings, but modulation is performed by the liquid crystal layer. More particularly, the polarization gratings are used as diffractive optical elements to control the direction and/or polarization state of transmitted light over a broad spectral range. Such arrangements may be used to provide projection and/or direct-view LCD devices with significant improvements in brightness and contrast, while using conventional liquid crystal materials as the switching element. Further embodiments of the present invention are described in detail below.

Some embodiments of the present invention may allow for doubling the light efficiency of liquid crystal (LC) microdisplays by replacing the polarizers in conventional LCD devices with transparent polymer, thin-film, polarizing beamsplitters, known as polarization gratings (PGs). In particular, achromatic, the reactive mesogen (polymerizable LC) films shown in FIGS. 9A and 10A may be employed as both polarizer and analyzer. The result is that both orthogonal polarizations (i.e., substantially all of the unpolarized light) can be directed through the microdisplay simultaneously, so that the display may have ~100% (brightness) efficiency (as opposed to <50% efficiency when using polarizers). Such "polymer-PG displays" may require little-or-no modifications to commercial, off-the-shelf LC microdisplays. FIGS. 10B, 10C, 11A, and 11B provide experimental results illustrating the operation principles of such polymer-PG displays, and experimentally show an overall ~90% efficiency and contrast ratios >200:1 for unpolarized LED light with up to ±7° aperture. Additionally, FIGS. 12A and 12B illustrate a prototype of a polymer-PG projection system using a modified commercial microdisplay.

Increased light efficiency and reduced power consumption presents a challenge for today's LCD market. Since the invention of twisted-nematic liquid crystals in 1971, LCDs have been the primary source of flat-panel displays. However, the efficiencies of LCDs may be limited due to losses (>50%) from polarizers. This is because most LCDs operate by controlling the direction of light polarization via the birefringence and twist of the LC layer, while the most efficient light sources (i.e. CCFLs and LEDs) produce on unpolarized light. There are a number of different approaches for polarizer-free displays, including LC gels, PDLCs, H-PDLCs, and binary LC gratings. All of them, however, may suffer to some degree or another from low contrast ratios, very narrow acceptance angles, and/or limited peak efficiencies. Recently, electrically switchable LCPGs have been used as highly efficient, polarization-independent light modulators. Furthermore, microdisplay prototypes for projection systems using LCPGs have been demonstrated, most recently using an LCOS backplane.

Figure 9A:
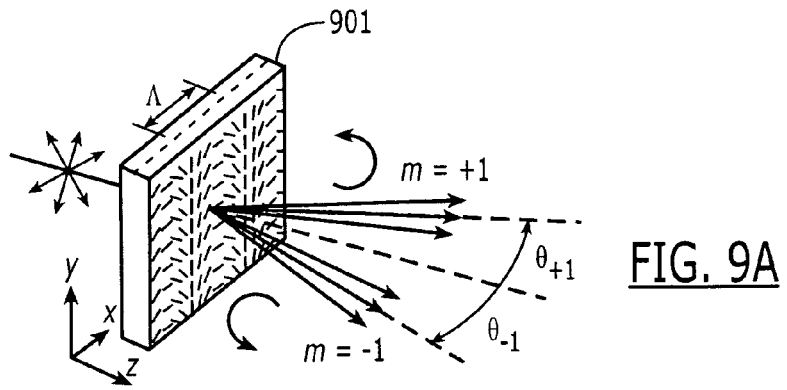
FIG. 9A is a diagram illustrating an achromatic polarization grating according to some embodiments of the present invention.
Figure 9B:
FIG. 9B is a photograph illustrating the light output from the achromatic polarization grating of FIG. 9A.

Polarization gratings have unique diffractive properties due to their spatially variant uniaxial birefringence. Some embodiments of the present invention employ polarization gratings having a periodic LC profile that experimentally has >99% diffraction efficiency over the entire visible wavelength range, formed in highly cross-linked acrylate polymer films, and which has the same polarization dependent properties of conventional PGs. FIG. 9A illustrates the behavior of an achromatic polarization grating (PG) 901 according to some embodiments of the present invention with white, unpolarized, input light. As shown in the photograph of FIG. 9B, the ±1 diffraction orders 902 and 903 are each circularly polarized, orthogonal, and can have (in total) up to 100% of the incident light propagating in them.

Embodiments of the present invention provide a highly efficient, polarization-independent microdisplay ("polymer-PG LC display") with achromatic PGs acting as polarizing and analyzing elements instead of polarizers. FIGS. 1A and 1B illustrate the basic geometry and operation principles of polymer-PG LC displays according to some embodiments of the present invention. Since conventional polarizers are not used, the light efficiency of the display can potentially be improved by a factor of two. It should be noted that contrast may be obtained using aperture stops and lenses to filter the diffraction orders. However, modification of the microdisplay may not be needed.

As in conventional LCDs, LC switching leads to light modulation. The first PG outputs circular polarizations in the first orders, the handedness of which is affected by LC switching and the relative orientation between the first and second PGs, as shown in FIGS. 1A and 1B. The second PG either diffracts the light into higher angles or directs it toward the normal direction based on the polarization handedness of light from the first PG. Although illustrated in FIGS. 1A and 1B as having an anti-parallel alignment of PGs, it is to be understood that embodiments of the present invention may include parallel alignment of PGs and/or other varied designs.

Figure 10A:
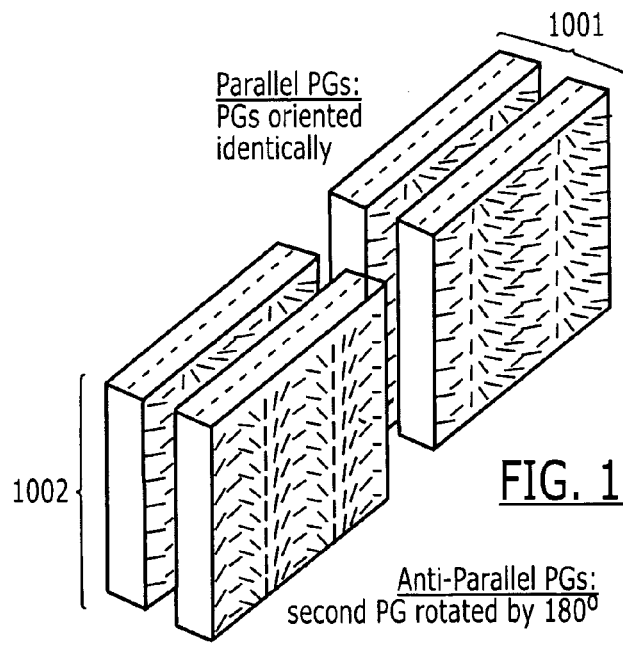
FIG. 10A is a diagram illustrating parallel and antiparallel polarization grating configurations according to some embodiments of the present invention.
Figure 10B:
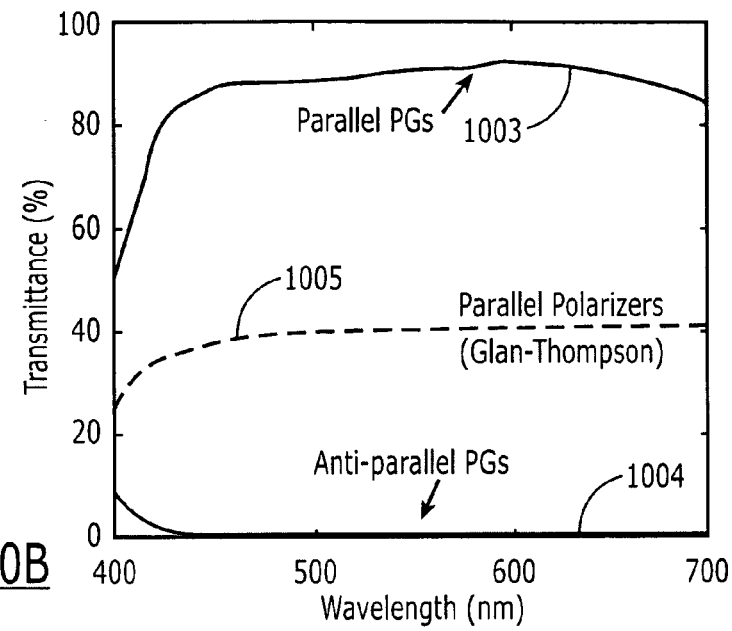
FIG. 10B is a graph illustrating measured transmittance spectra for both polarization grating configurations of FIG. 10A.
Figure 10C:
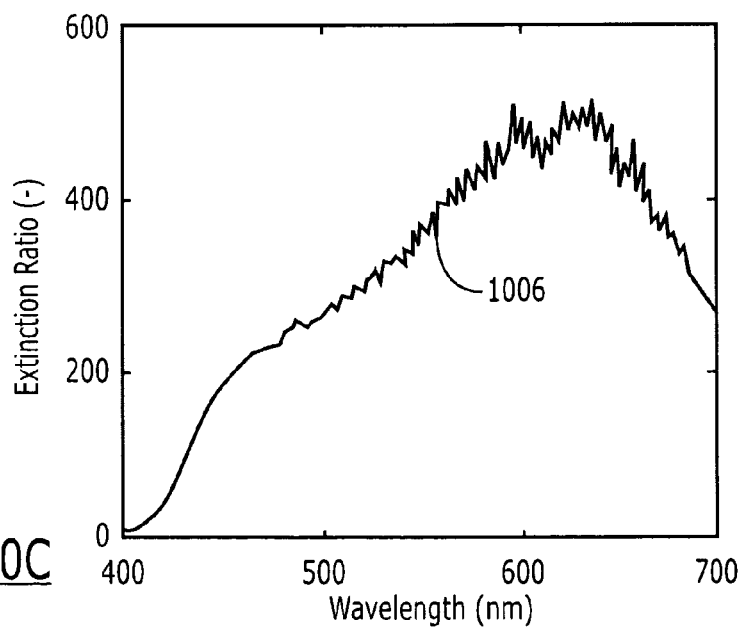
FIG. 10C is a graph illustrating the measured extinction ratio for the an anti-parallel polarization grating arrangement of FIG. 10A.

FIG. 10A illustrates parallel 1001 and antiparallel 1002 PG configurations according to embodiments of the present invention, which are described below to highlight the upper limits for brightness and contrast ratios. For experimental demonstration, a pair of achromatic PG samples (grating period=4 μm, acceptance angle±7° for green light) with high efficiencies (>98%) for red, green, and blue LED lights. Fabrication methods and optical properties of these gratings have been previously described. The parallel 1001 and anti-parallel 1002 orientations are nearly equivalent to the bright-state and dark-state of the display, respectively. FIG. 10B illustrates the true (measured) transmittance spectra of both configurations, for unpolarized input light. Waveform 1003 shows that parallel PGs may manifest about 90% transmittance, while waveform 1004 shows that anti-parallel PGs may leak less than about 0.5% for visible light (400-700 nm). Waveform 1005 illustrates the transmittance spectra for parallel polarizers. Waveform 1006 of FIG. 10C shows that the measured extinction ratio of an anti-parallel PG arrangement 1002 according to some embodiments of the present invention (analogous to crossed-polarizers) is ≧200, and has a peak of ~500 in the red). It should be noted that anti-reflection coated glasses were used to reduce Fresnel losses.

Electro-optical switching was also demonstrated with a single monolithic pixel with a conventional LC cells (with vertical-alignment (VA) mode). As shown in FIGS. 1A and 1B) two achromatic polymer PGs were aligned in anti-parallel orientations to a LC cell, which controls the polarization of light passing through it. More particularly, when a relatively high voltage (~5V) is applied, the VA-mode LC cell will present a half-wave retardation due to its predominantly planar alignment, and will therefore reverse the polarizations of the two beams (simultaneously) passing through it (from the first PG). This light will then be directed toward the normal direction by the second PG, as shown in FIG. 1B, and subsequently projected to the screen/viewer. However, when no voltage is applied to the VA-mode LC cell, it presents very little retardation, and light entering the LC layer from the first PG will retain its original polarization (simultaneously) and be diffracted to even higher angles by the second PG, as shown in FIG. 1A.

Figure 11A:
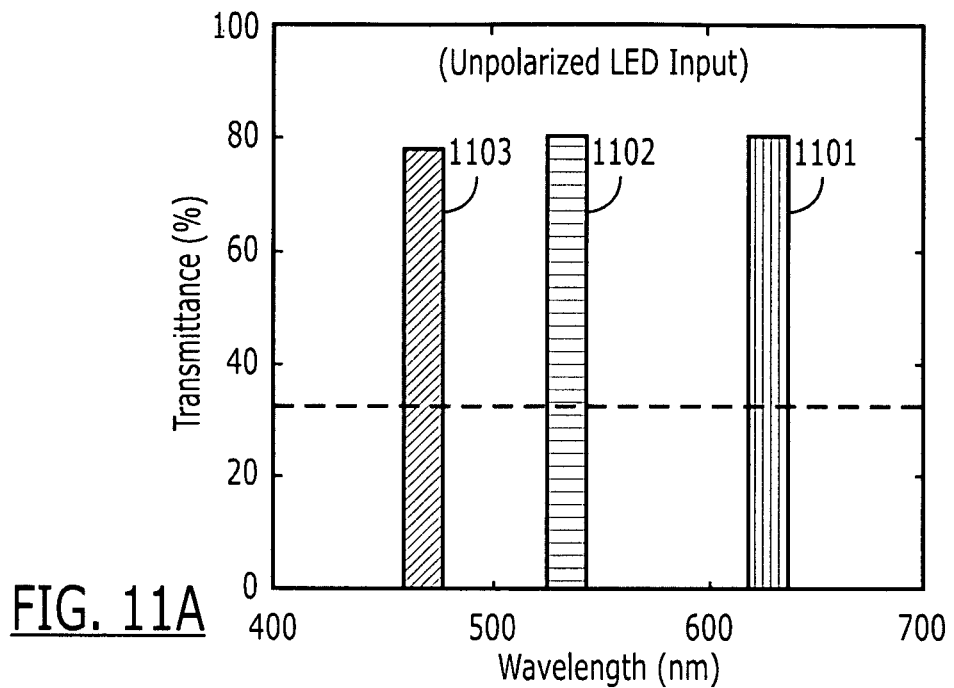
FIGS. 11A and 11B are graphs illustrating transmittance and contrast ratios, respectively, for liquid crystal display devices according to some embodiments of the present invention.
Figure 11B:
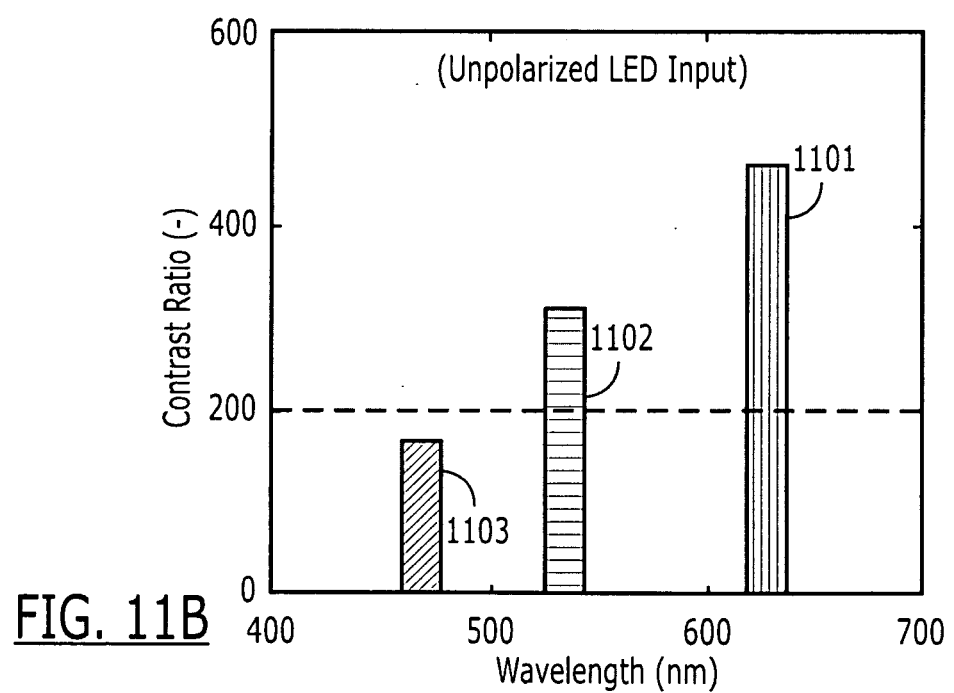
Figure 12A:
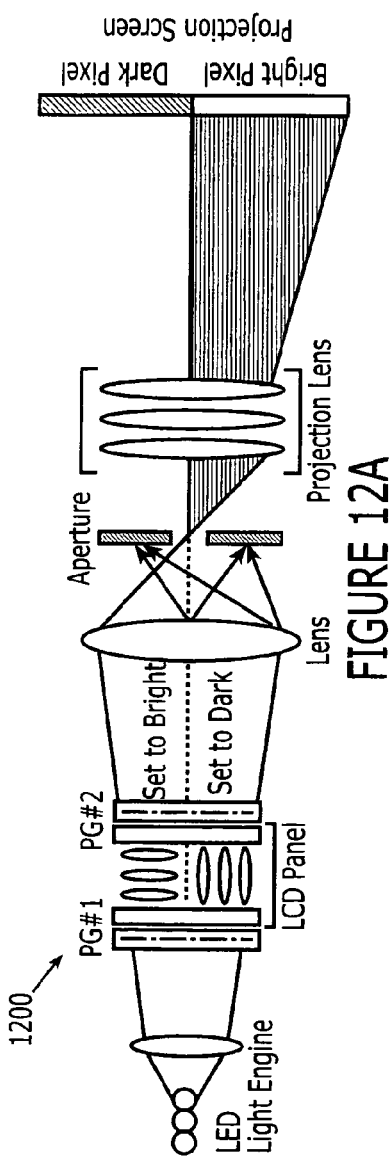
FIGS. 12A-12C illustrate a prototype projector in accordance with some embodiments of the present invention.
Figure 12B:
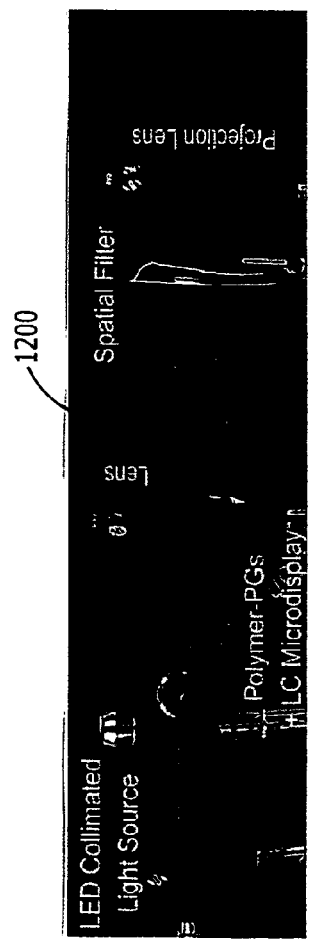

The transmittance and contrast ratios for three LED colors (unpolarized!) in a polymer-PG LC display according to some embodiments of the present invention are presented in the graphs of FIGS. 11A and 11B, respectively. In particular, bright-state transmittance is shown for red 1101 (625 nm), green 1102 (530 nm), and blue 1103 (470 nm) unpolarized LEDs in FIG. 11A, while contrast ratios (bright/dark) for the three LEDs 1101, 1102, and 1103 is shown in FIG. 11B. The dashes 1105 in FIG. 11A illustrate the estimated transmittance of a crossed-polarizer LC pixel in the same configuration. As shown in FIG. 11A, the true transmittance to unpolarized light for the polymer-PG LC modulator according to some embodiments of the present invention is ≧80%, more than double that of a conventional polarizer-based display, while still maintaining modest contrast ratios (200:1 to 500:1), as shown in FIG. 11B.

Figure 12C:
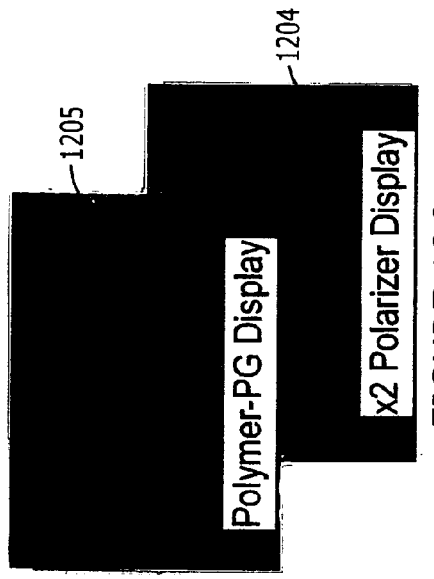

To confirm the imaging properties of the Polymer-PG Display, a prototype projector was built using a commercial LC microdisplay panel (Iljin Display, 0.41" VGA, planar-alignment mode) with achromatic PG films in accordance with some embodiments of the present invention, as shown in FIGS. 12A-12C. A Golden-eye LED light source was used, which supports color-sequential display operation, and the polarizers were removed from the commercial microdisplay. The PG films according to some embodiments of the present invention were aligned in anti-parallel configuration and the grating direction. The overall geometry of the system 1200 is shown in FIG. 12A, and a photograph of the system 1200 is shown in FIG. 12B. The elements of the system 1200 may correspond to similar elements illustrated in the system 300a of FIG. 3A. Parallax was observed in projected images with a small spatial offset, which may be attribute to the distance (glass thickness) between the imaging plane and the second PG. This parallax problem can be avoided by inserting the second PG inside the LC cell in some embodiments. An alternative solution is to arrange two additional parallel PGs (similar or identical to the PGs already chosen) with the same gap thickness as the glass after the second PG, which may perfectly compensate for the spatial offset, as discussed above with reference to the embodiment of FIG. 5.

The Polymer-PG display projects bright pixels that may be up to twice as bright as the polarizer-based display. FIG. 12C provides a comparison of projected images from the original display 1204 and a polymer-PG display according to some embodiments of the present invention 1205, which shows equivalently sharp edges and excellent image focus. It should be noted that color degradations and low image contrasts seen in the polymer-PG display image 1205 of FIG. 12C may be due to the absence of any retardation compensation (removed from the original display along with the polarizers) in these initial tests, which will be integrated in production displays.

Thus, polymer-PG displays according to some embodiments of the present invention may improve the light efficiency of LC microdisplays by using diffractive transparent polymer thin films. Brightness of (unmodified) commercial LC microdisplays can be roughly doubled, and standard étendue-limited light sources may be used. Embodiments of the present invention may be targeted for use in portable projectors, due to the high efficiency of the system.

The foregoing is illustrative of the present invention and is not to be construed as limiting thereof. Although a few exemplary embodiments of this invention have been described, those skilled in the art will readily appreciate that many modifications are possible in the exemplary embodiments That which is claimed:

1. A liquid crystal device, comprising:
a first optical element configured to polarize and diffract unpolarized incident light into first and second beams having orthogonal circular polarizations and having different directions of propagation than that of the incident light;
a liquid crystal layer configured to receive the first and second beams from the first optical element and configured to be switched between a first state that does not substantially alter respective polarizations of the first and second beams traveling therethrough and a second state that alters the respective polarizations of the first and second beams traveling therethrough; and
a second optical element configured to receive the first and second beams from the liquid crystal layer and configured to analyze and diffract the first and second beams to alter the respective directions of propagation of both the first and second beams in response to each of the first and second states of the liquid crystal layer,
wherein the second optical element is configured to transmit both the first and second beams in a direction substantially parallel to that of the incident light when the liquid crystal layer is in one of the first and second states, and to transmit the first and second beams in respective directions that are not substantially parallel to that of the incident light when the liquid crystal layer is in the other of the first and second states.

2. The device of claim 1, wherein the first optical element comprises a first polarization grating having a first periodic birefringence pattern, and wherein the second optical element comprises a second polarization grating having a second periodic birefringence pattern that is inverted relative to the first birefringence pattern.

3. The device of claim 2, wherein the first polarization grating comprises a polymerized liquid crystal layer including a first periodic nematic director pattern, and wherein the second polarization grating comprises a polymerized liquid crystal layer including a second periodic nematic director pattern having a same periodicity and globally rotated about 180 degrees relative to the first periodic nematic director pattern.

4. The device of claim 1, wherein the second optical element is configured to alter the directions of propagation of both of the first and second beams to transmit light that propagates in a direction substantially parallel to that of the incident light when the liquid crystal layer is in the first state, and to transmit light that does not propagate in the direction substantially parallel to that of the incident light when the liquid crystal layer is in the second state.

5. The device of claim 4, wherein the first optical element comprises a first polarization grating having a first periodic birefringence pattern, and wherein the second optical element comprises a second polarization grating having a second periodic birefringence pattern that has a same periodicity and orientation as that of the first periodic birefringence pattern.

6. The device of claim 1, wherein the second state of the liquid crystal layer is configured to reverse the respective polarizations of the first and second beams.

7. The device of claim 1, further comprising:
an angle filtering stage configured to receive output light transmitted from the second optical element, wherein the angle filtering stage is configured to block the output light that propagates at angles greater than a desired angle and direct the output light that propagates at angles less than the desired angle towards a screen.

8. The device of claim 7, wherein the angle filtering stage comprises at least one lens and an aperture stop configured to permit the output light from the second optical element that propagates in a direction substantially parallel to the incident light to travel therethrough but block the output light from the second optical element that does not propagate in the direction substantially parallel to that of the incident light.

9. The device of claim 7, wherein the angle filtering stage comprises a privacy film configured to permit the output light from the second optical element that propagates in a direction substantially parallel to the incident light to travel therethrough but block the output light from the second optical element that does not propagate in the direction substantially parallel to that of the incident light.

10. The device of claim 1, wherein the incident light comprises unpolarized light, and wherein the first optical element is configured to diffract the incident light such that the first and second beams respectively comprise greater than about 25% of an intensity of the incident light over a visible wavelength range.

11. The device of claim 10, wherein the second optical element is configured to diffract the first and second beams to transmit output light comprising greater than about 50% of the intensity of the incident light over the visible wavelength range of about 400 nm to about 700 nm.

12. The device of claim 1, wherein at least one of the first and second optical elements comprises:
a first polarization grating layer comprising a first periodic molecular structure;
a second polarization grating layer on the first polarization grating layer, the second polarization grating layer comprising a second periodic molecular structure that has a same periodicity as the first periodic molecular structure and defines a first phase shift relative thereto along an interface between the first and second polarization grating layers; and
a third polarization grating layer on the second polarization grating layer such that the second polarization grating layer is between the first and third polarization grating layers, the third polarization grating layer comprising a third periodic molecular structure that has the same periodicity as that of the second periodic molecular structure and defines a second phase shift relative thereto along an interface between the second and third polarization grating layers.

13. The device of claim 1, wherein at least one of the first and second optical elements comprises:
a first polarization grating layer on the substrate, the first polarization grating layer comprising a molecular structure that is rotated by a first twist angle over a first thickness defined between opposing faces of the first polarization grating layer such that a local anisotropy pattern of the first polarization grating layer has a continuously variable phase shift over the first thickness; and a second polarization grating layer on the first polarization grating layer, the second polarization grating layer comprising a molecular structure that is rotated by a second twist angle opposite the first twist angle over a second thickness defined between opposing faces of the second polarization grating layer such that a local anisotropy pattern of the second polarization grating layer has a continuously variable phase shift over the second thickness opposite that of the first polarization grating layer.

14. The device of claim 1, wherein the liquid crystal layer defines a pixel array including a plurality of pixels respectively configured to be switched between the first and second states.

15. The device of claim 1, further comprising:

a lens configured to receive the first and second beams from the first optical element and image the first and second beams onto the second optical element.

16. A liquid crystal device, comprising:

a first polarization grating configured to polarize and diffract incident light into first and second beams having different polarizations and having different directions of propagation than that of the incident light;

a liquid crystal layer configured to receive the first and second beams from the first polarization grating and configured to be switched between a first state that does not substantially alter respective polarizations of the first and second beams traveling therethrough and a second state that alters the respective polarizations of the first and second beams traveling therethrough;

a second polarization grating configured to receive the first and second beams from the liquid crystal layer and configured to analyze and diffract the first and second beams to alter the respective directions of propagation thereof in response to the state of the liquid crystal layer;

a third polarization grating configured to receive and diffract the first and second beams from the second polarization grating to alter the respective directions of propagation thereof;

an intermediate layer configured to transmit the first and second beams from the third polarization grating therethrough without substantially altering the respective directions of propagation thereof; and a fourth polarization grating configured to receive and diffract the first and second beams from the intermediate layer to alter the respective directions of propagation thereof to provide offset-compensated output light that propagates in a direction substantially parallel to that of the first and second beams output from the second polarization grating, wherein the intermediate layer has a thickness configured to separate the third and fourth polarization gratings by a distance substantially similar to a distance between the second polarization and the liquid crystal layer such that the offset-compensated output light has a reduced spatial offset relative to that of the first and second beams output from the second polarization grating.

* * * * *